US012241166B2

(12) United States Patent
Lee et al.

(10) Patent No.: US 12,241,166 B2
(45) Date of Patent: Mar. 4, 2025

(54) ELECTRODE CATALYST FOR WATER ELECTROLYSIS AND METHOD FOR PREPARING SAME

(71) Applicants: RESEARCH & BUSINESS FOUNDATION SUNGKYUNKWAN UNIVERSITY, Suwon-si (KR); INSTITUTE FOR BASIC SCIENCE, Daejeon (KR)

(72) Inventors: Hyoyoung Lee, Uiwang-si (KR); Jadhav Amol, Suwon-si (KR)

(73) Assignees: RESEARCH & BUSINESS FOUNDATION SUNGKYUNKWAN UNIVERSITY, Suwon-si (KR); INSTITUTE FOR BASIC SCIENCE, Daejeon (KR)

( * ) Notice: Subject to any disclaimer, the term of this patent is extended or adjusted under 35 U.S.C. 154(b) by 526 days.

(21) Appl. No.: 17/588,597

(22) Filed: Jan. 31, 2022

(65) Prior Publication Data

US 2022/0259748 A1    Aug. 18, 2022

(30) Foreign Application Priority Data

Feb. 2, 2021    (KR) .................. 10-2021-0014658

(51) Int. Cl.
*C25B 11/053* (2021.01)
*C25B 1/04* (2021.01)

(52) U.S. Cl.
CPC .............. *C25B 11/053* (2021.01); *C25B 1/04* (2013.01)

(58) Field of Classification Search
None
See application file for complete search history.

(56) References Cited

FOREIGN PATENT DOCUMENTS

| KR | 10-2006-0035547 A | 4/2006 |
| KR | 10-2020-0110455 A | 9/2020 |
| KR | 10-2021-0008815 A | 1/2021 |

OTHER PUBLICATIONS

J. G. Vos, et al., "MnOx/IrOx as Selective Oxygen Evolution Electrocatalyst in Acidic Chloride Solution", Journal of the American Chemical Society, 140(32): p. 10270-10281, Jul. 2018.*
Chen, Jiande et al., "Interfacial Interaction between FeOOH and Ni—Fe LDH to Modulate the Local Electronic Structure for Enhanced OER Electrocatalysis," ACS Catalysis, vol. 8, No. 12, 2018, (pp. 11342-11351).
Yu, Xiaowen et al., "Hydrogen Evolution Reaction in Alkaline Media: Alpha- or Beta-Nickel Hydroxide on the Surface of Platinum?," ACS Energy Letters, vol. 3, No. 1, 2018, (pp. 237-244).

(Continued)

*Primary Examiner* — J. Christopher Ball
(74) *Attorney, Agent, or Firm* — NSIP Law

(57) ABSTRACT

The present application relates to an electrode catalyst for water electrolysis including a first transition metal foam, a metal layered double hydroxide (LDH)/metal oxide mixed layer which contains a second transition metal and a third transition metal that are formed on the surface of the first transition metal foam, and fourth transition metal oxyhydroxide nanoparticles formed on the surface of the mixed layer, in which the mixed layer surface contains the metal layered double hydroxide.

16 Claims, 37 Drawing Sheets

(56) References Cited

OTHER PUBLICATIONS

Li, Man et al., "Hybridizing NiCo2O4 and Amorphous NixCoy Layered Double Hydroxides with Remarkably Improved Activity toward Efficient Overall Water Splitting," ACS Sustainable Chemistry & Engineering, vol. 7, No. 5, 2019, (pp. 4784-4791).

Dahanayaka, Madhavi et al., "Ionised graphene oxide membranes for seawater desalination," Desalination, vol. 496, 2020, (11 Pages in English).

Jadhav, Amol R., et al. "Stable complete seawater electrolysis by using interfacial chloride ion blocking layer on catalyst surface." *Journal of Materials Chemistry A* 8.46 (Oct. 28, 2020): pp. 24501-24514.; (14pages in English).

\* cited by examiner

[Fig. 1A]
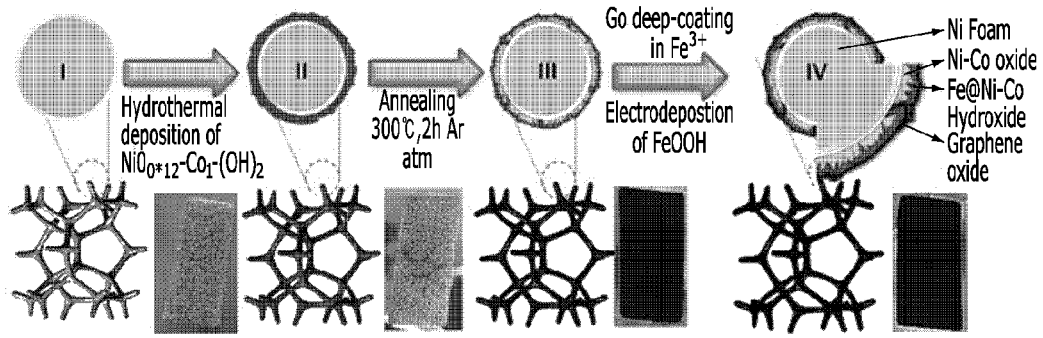
[Fig. 1B]
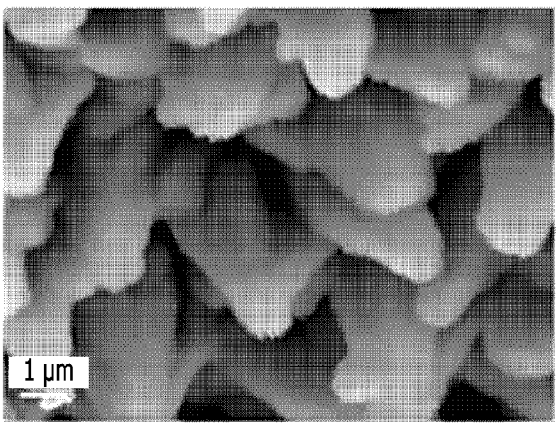
[Fig. 1C]
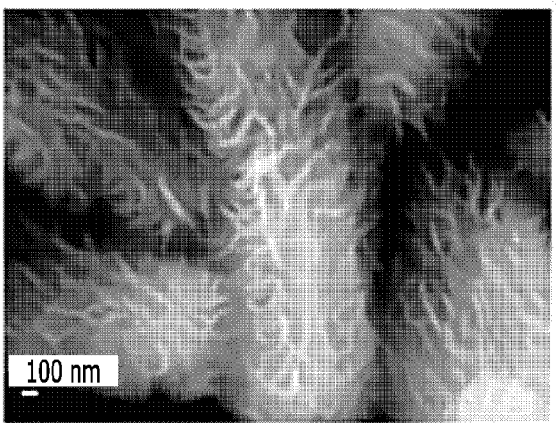

[Fig. 1D]
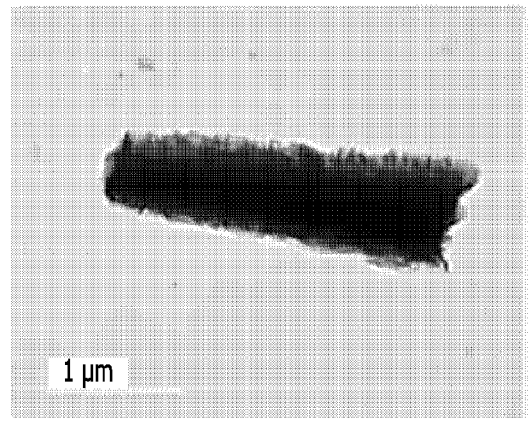
[Fig. 1E]
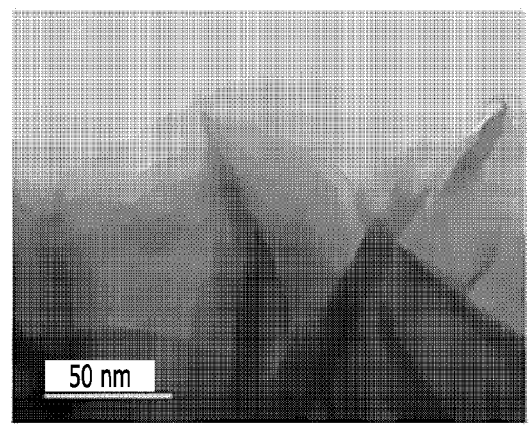
[Fig. 1F]
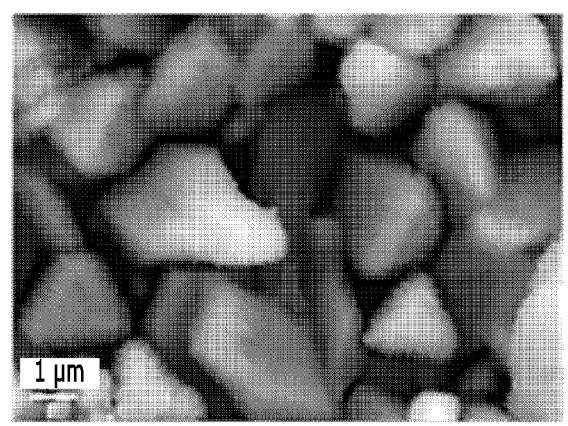

[Fig. 1G]
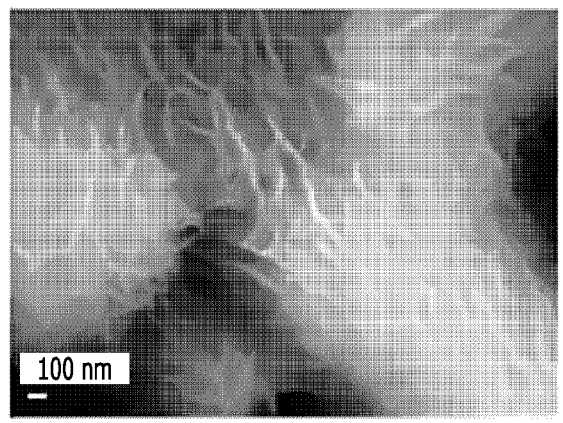
[Fig. 1H]
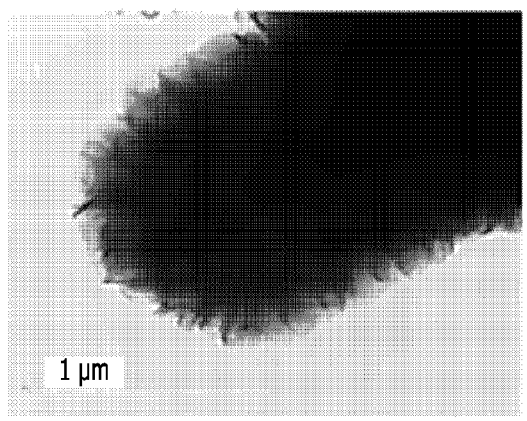
[Fig. 1I]
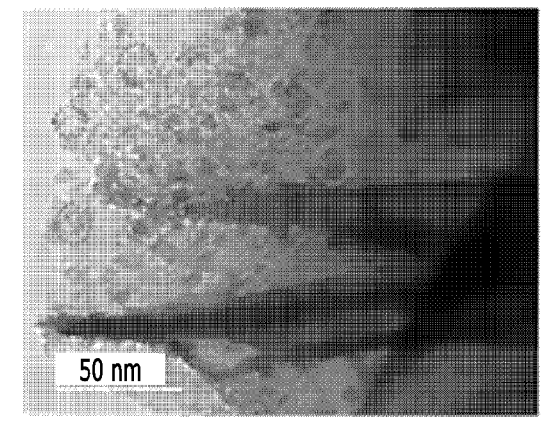

[Fig. 1J]
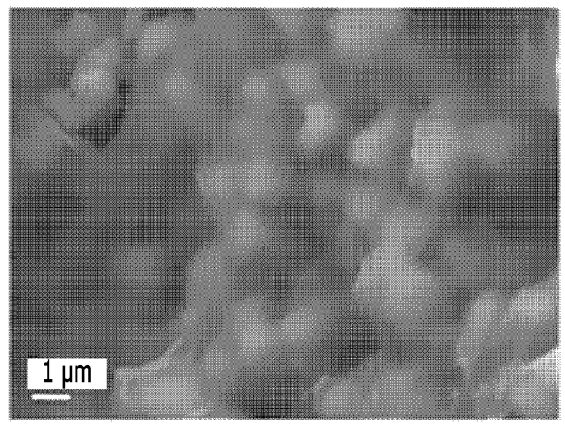
[Fig. 1K]
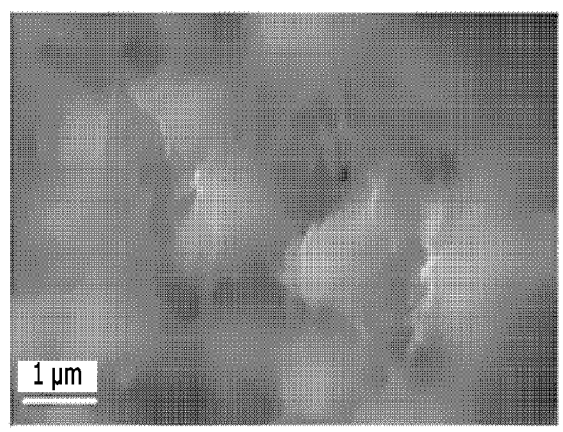
[Fig. 1L]
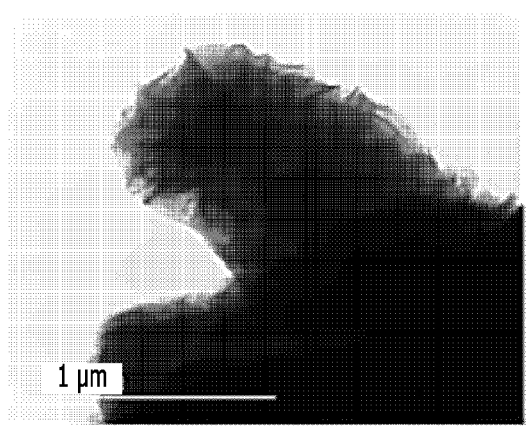

[Fig. 1M]
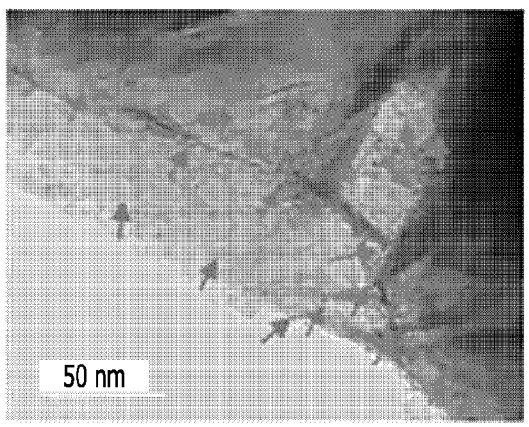
[Fig. 1N]
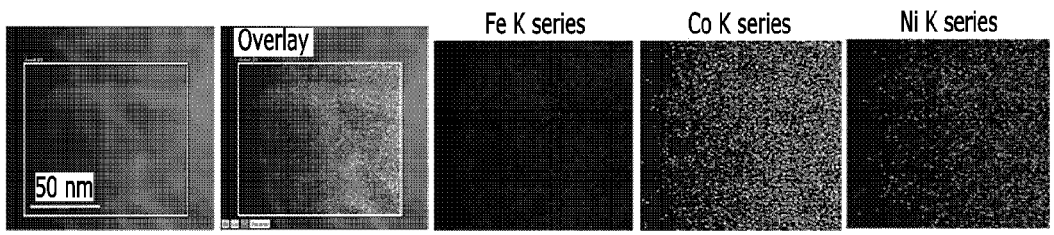

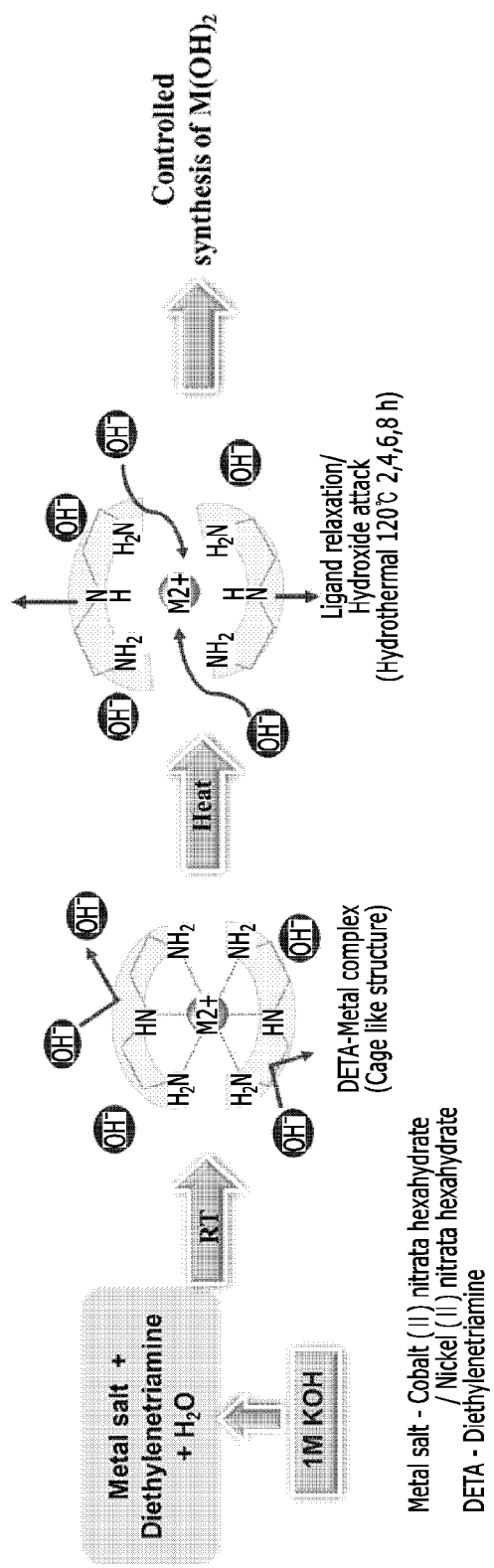
[Fig. 2]

[Fig. 3]
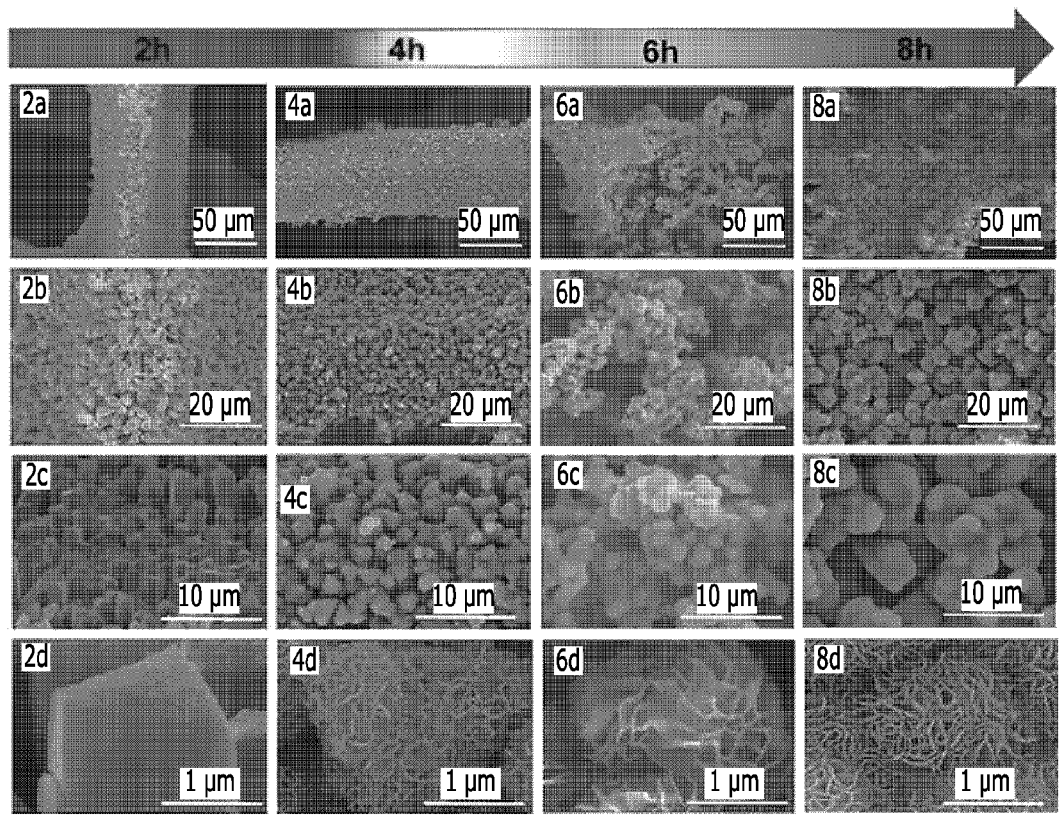
[Fig. 4]
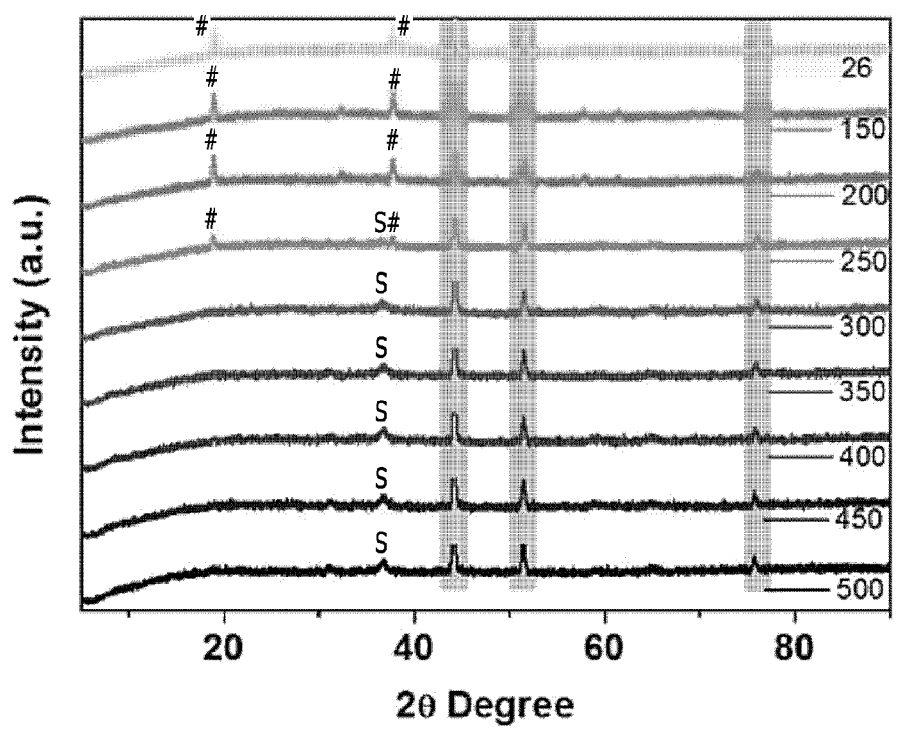

[Fig. 5A]
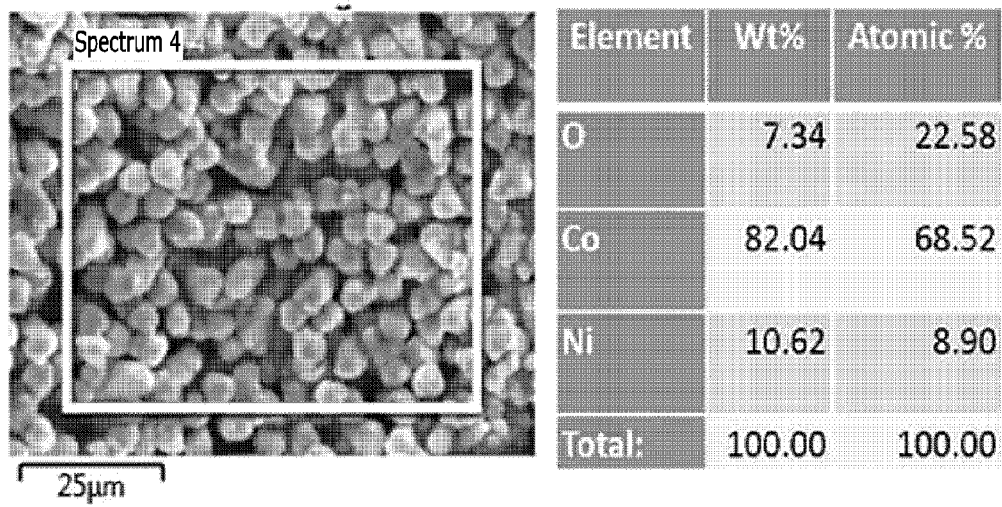
[Fig. 5B]
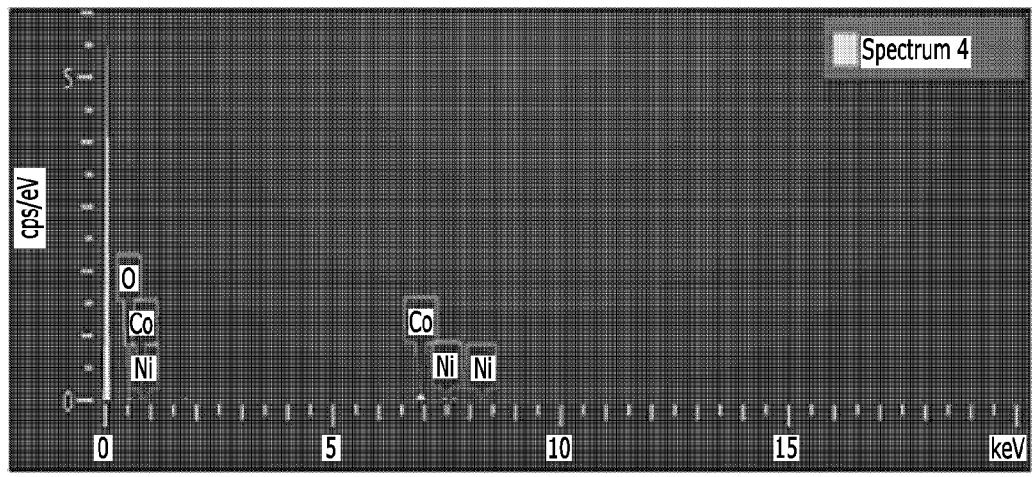

[Fig. 6A]
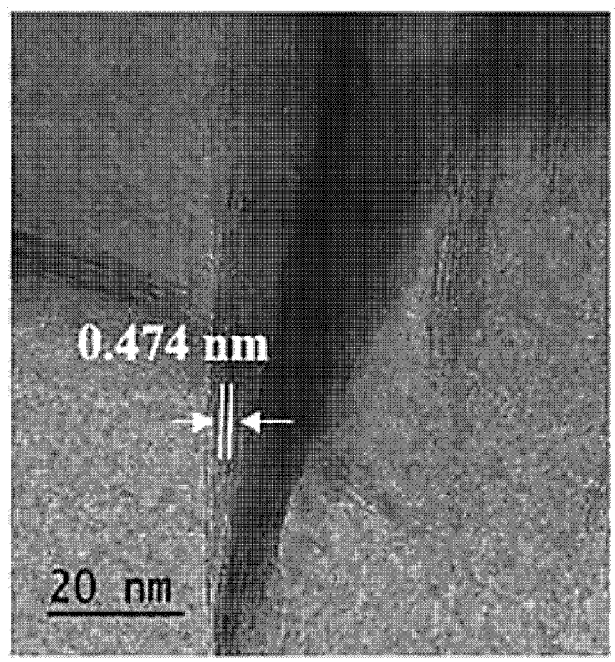
[Fig. 6B]
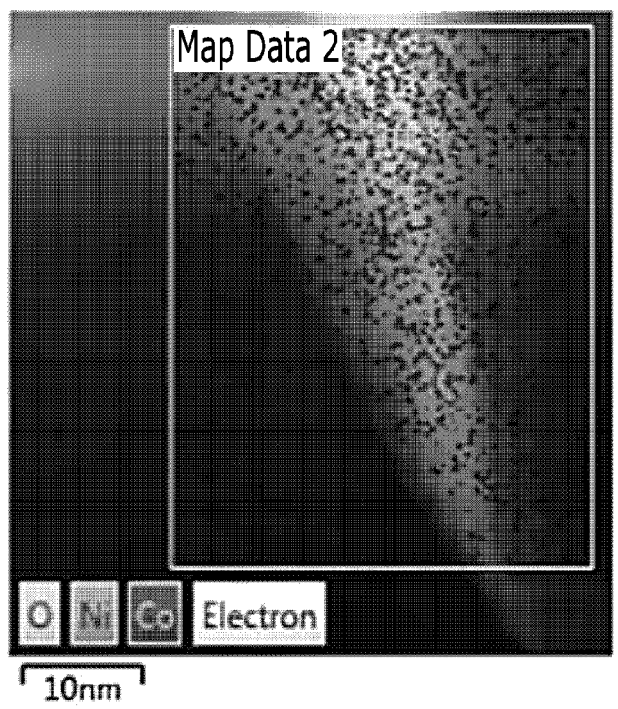

[Fig. 6C]
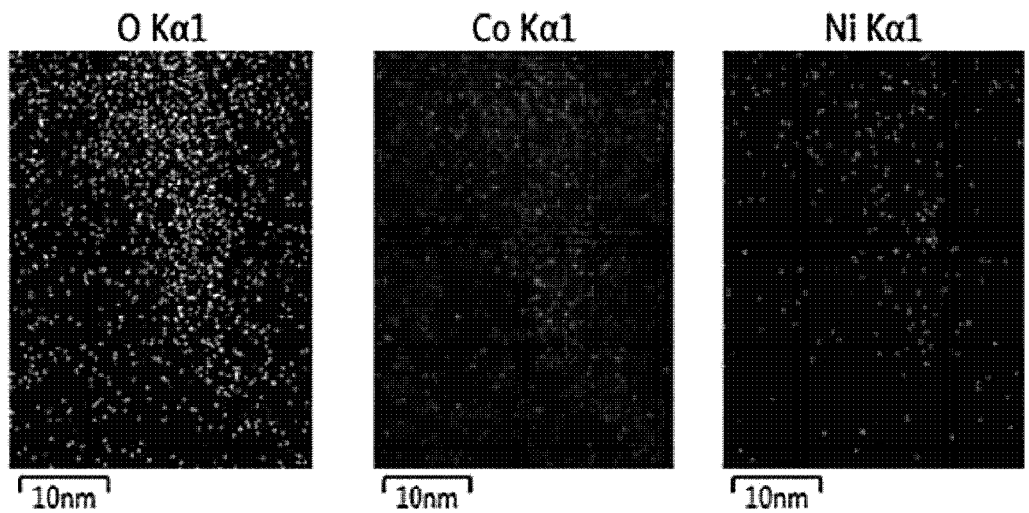
[Fig. 7]
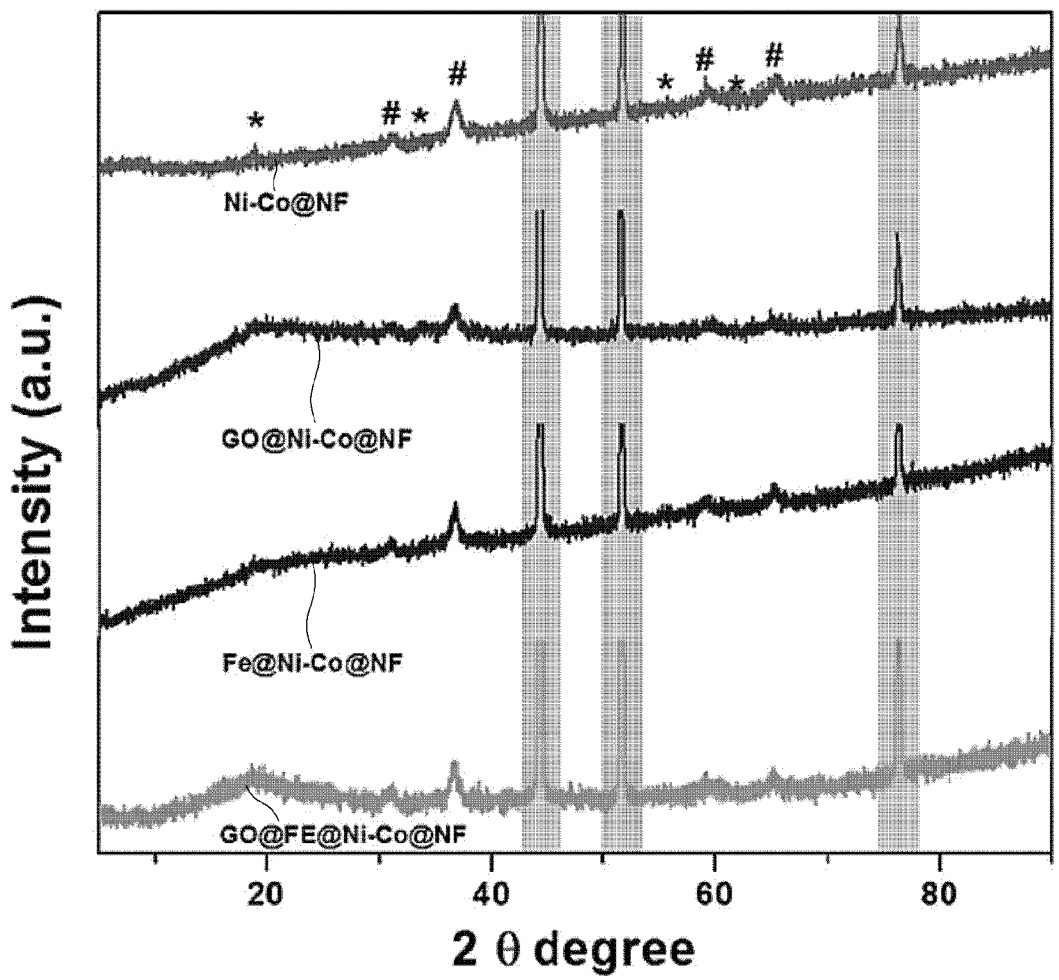

[Fig. 8A]
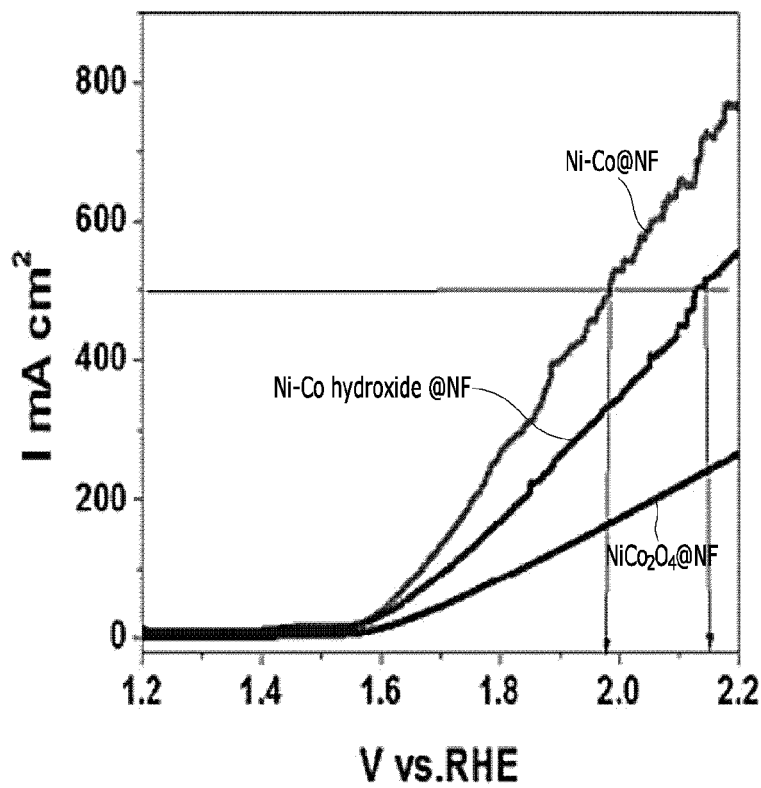
[Fig. 8B]
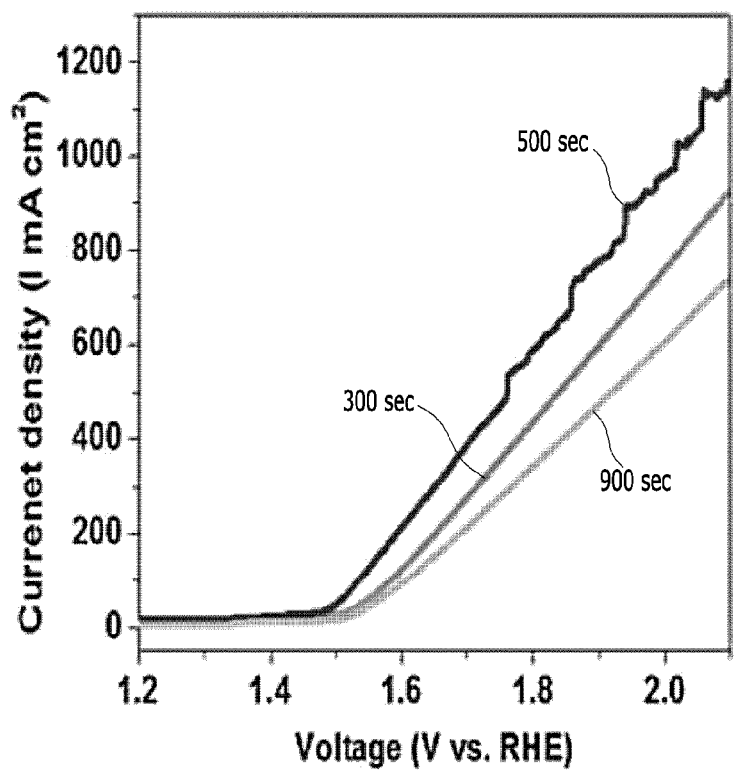

[Fig. 9A]
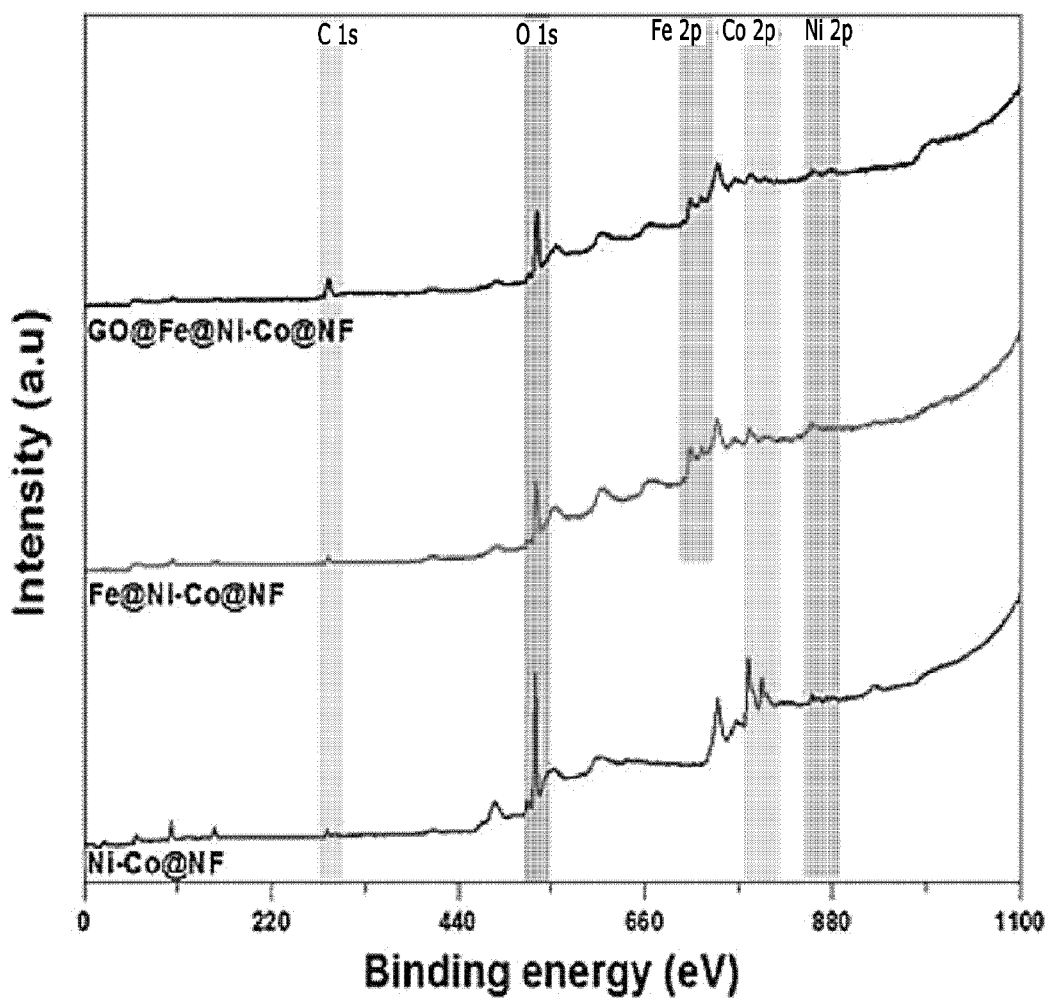

[Fig. 9B]
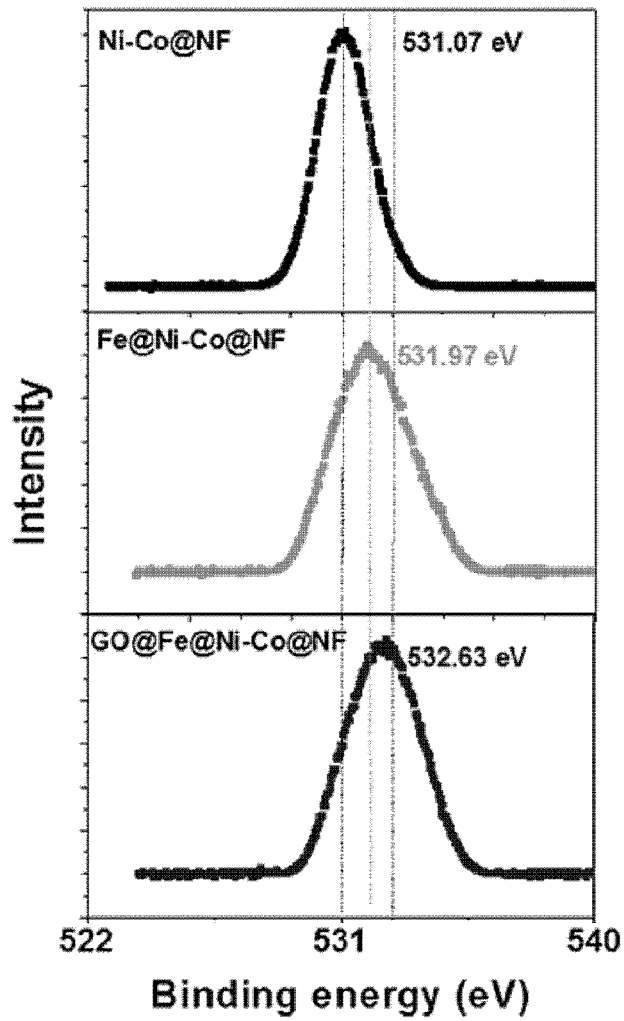
[Fig. 10A]
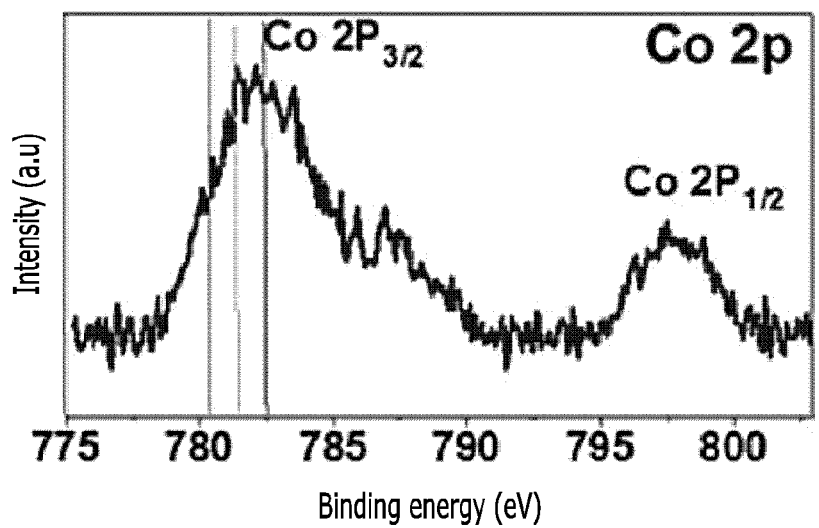

[Fig 10B]
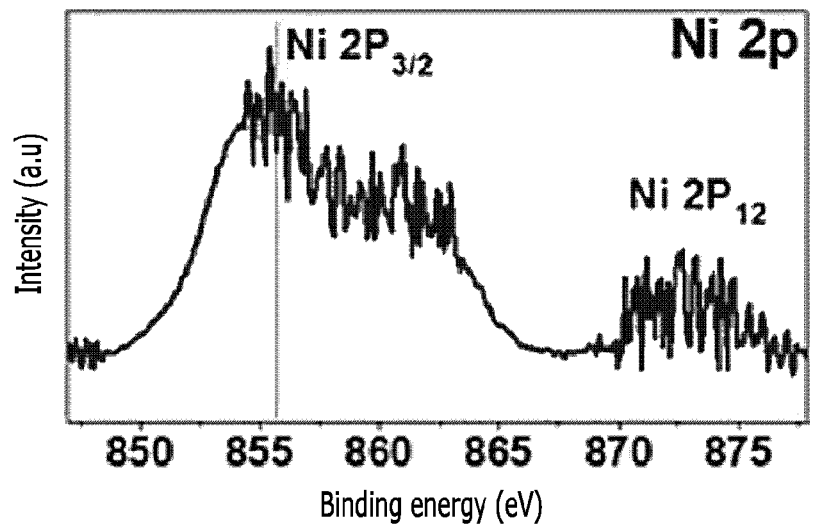
[Fig 10C]
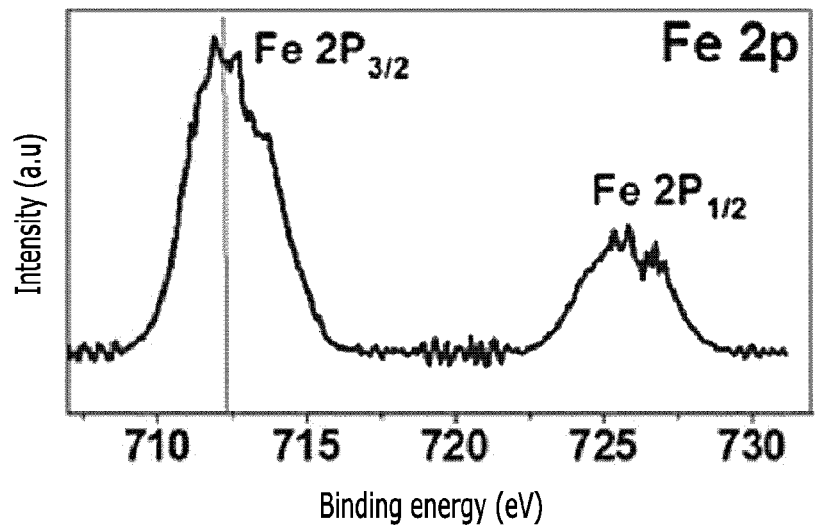

[Fig. 10D]
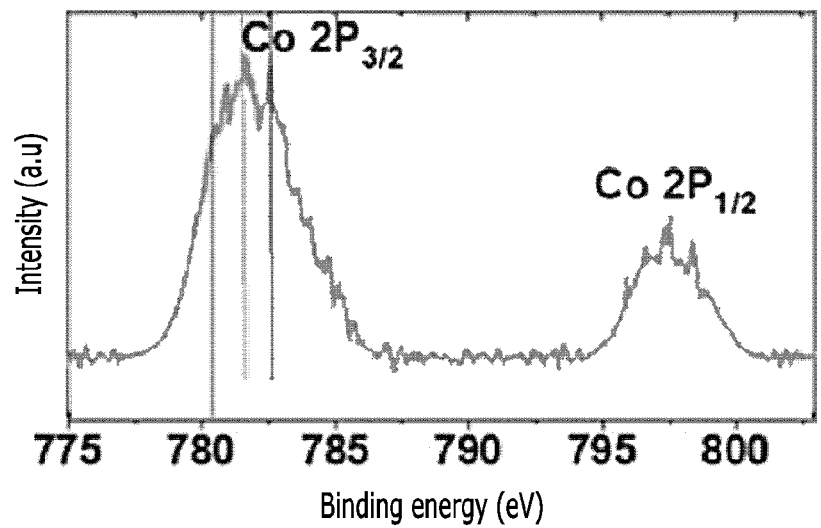
[Fig. 10E]
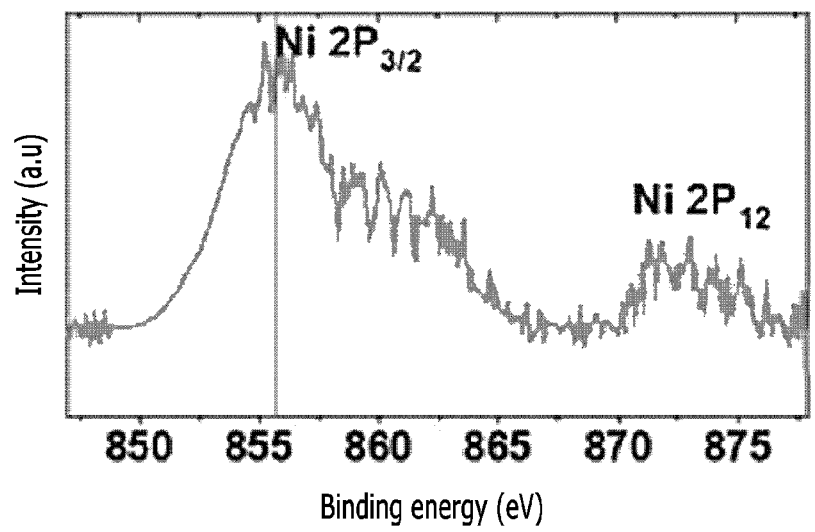

[Fig. 10F]
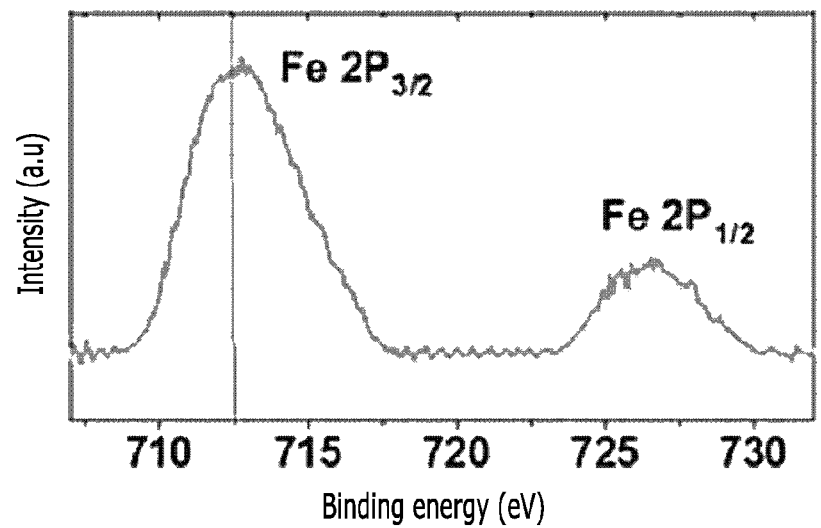
[Fig. 10G]
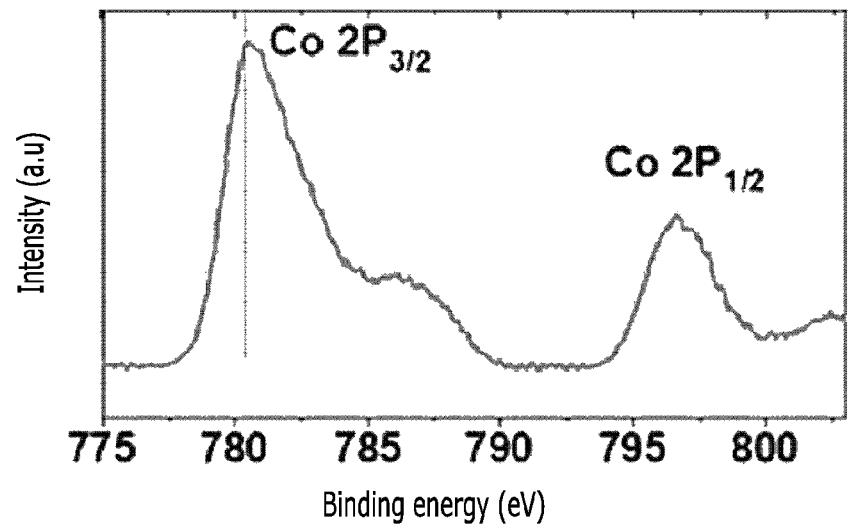

[Fig. 10H]
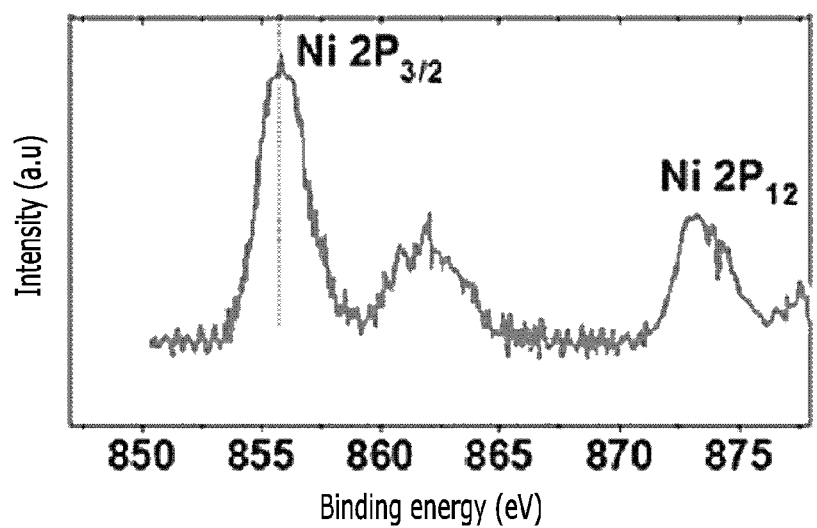
[Fig. 10I]
(i)
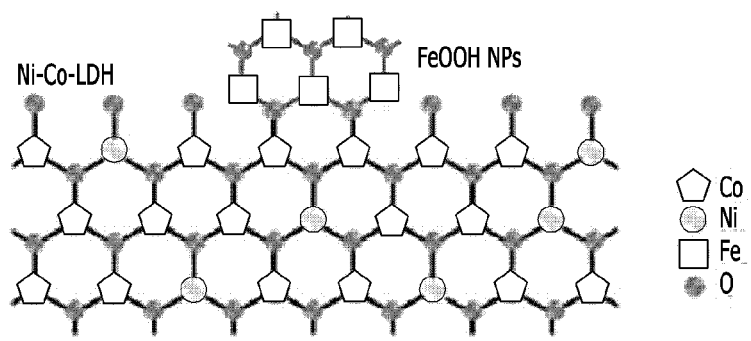

[Fig. 11A]
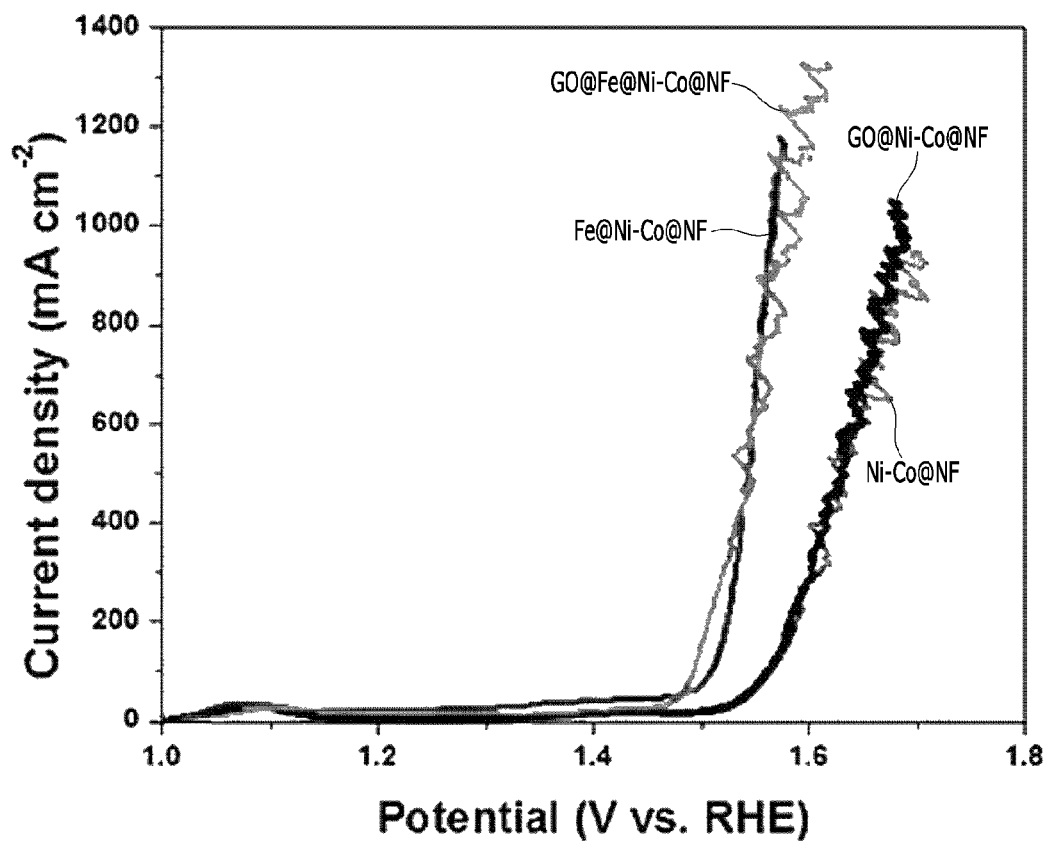

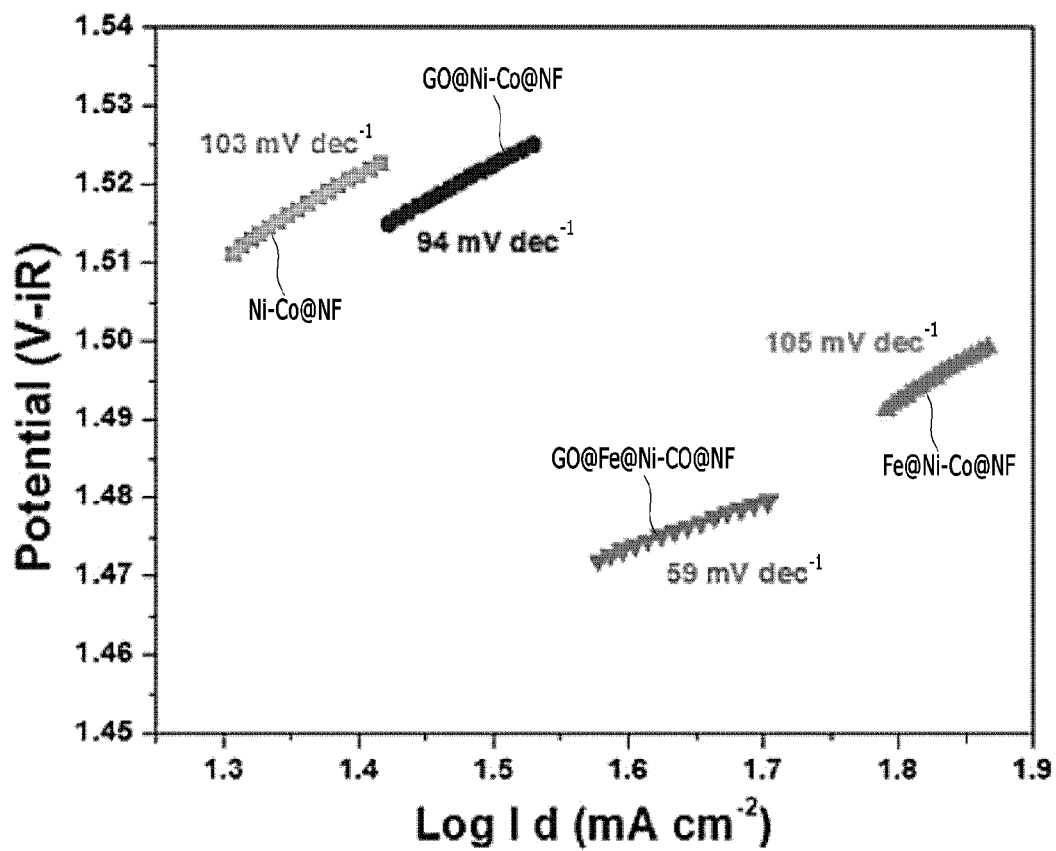
[Fig. 11B]

[Fig. 11C]
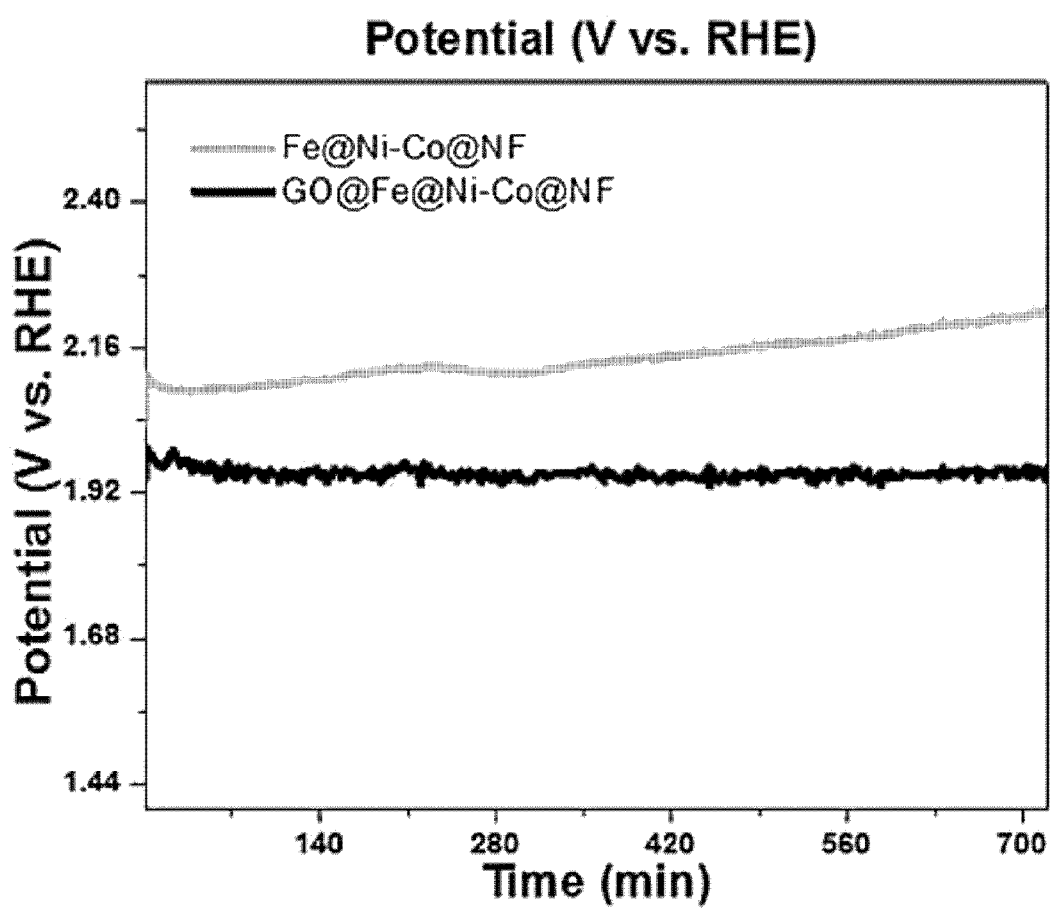

[Fig. 11D]
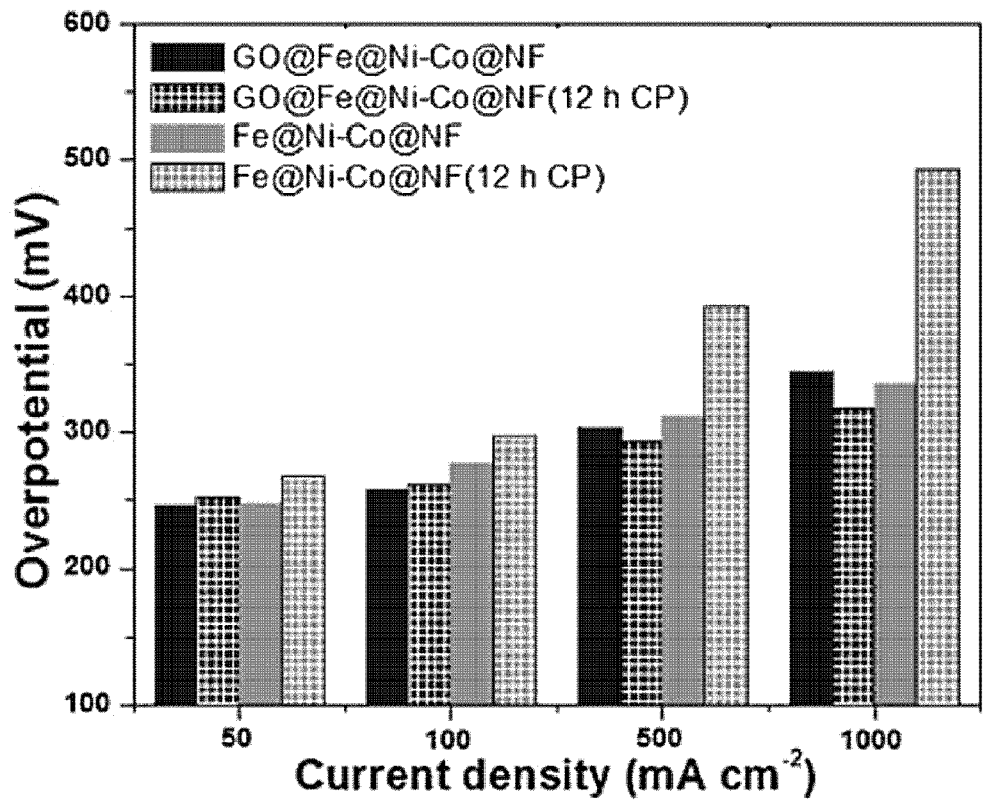
[Fig. 11E]
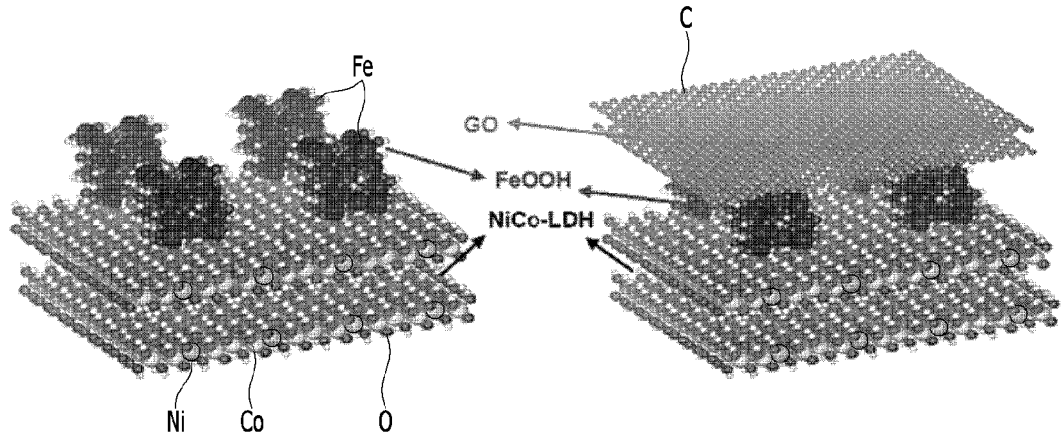

[Fig. 12]
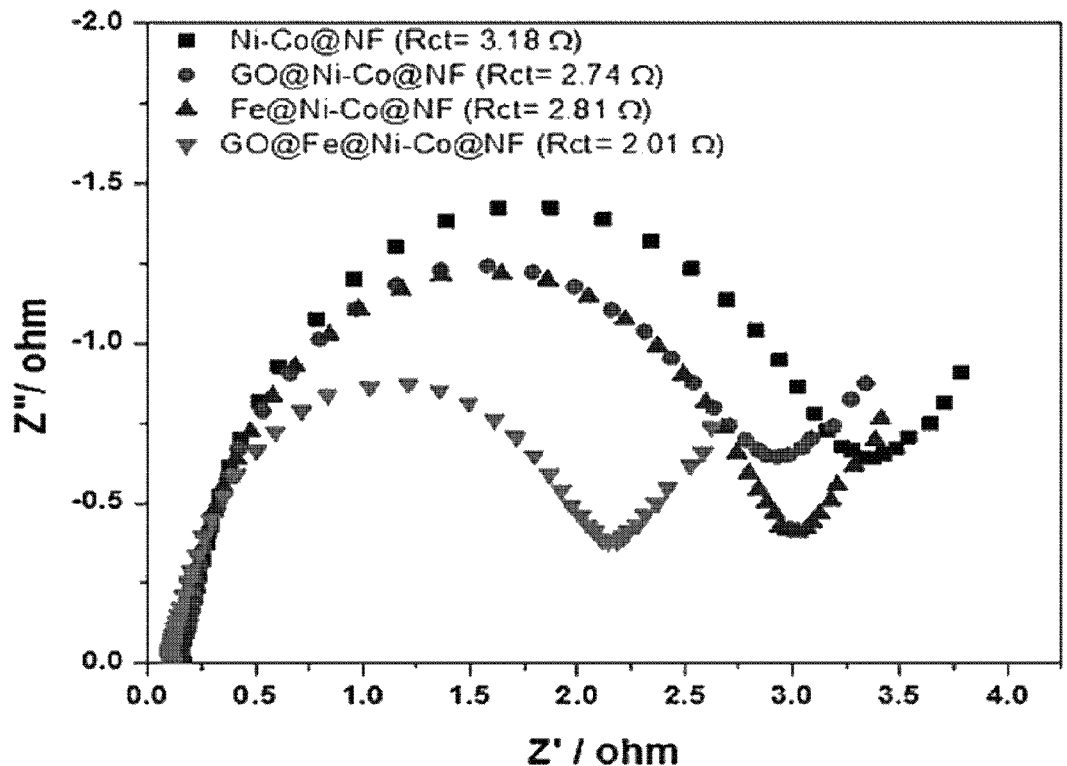
[Fig. 13]
| Electro-catalyst | Element Label (nm) | Conc(mg kg⁻¹) |
|---|---|---|
| Fe@Ni-Co@NF | Co | 0.0391 |
|  | Fe | 0.0293 |
|  | Ni | 0.0015 |
| GO@Fe@Ni-Co@NF | Co | 0.0092 |
|  | Fe | 0.0315* |
|  | Ni | 0.00002 |
(*The Fe dissolution concentration is slightly high, which is possibly because of the FeOOH particle, those are deposited on outer graphene oxide layer during electrodeposition)

[Fig. 14]
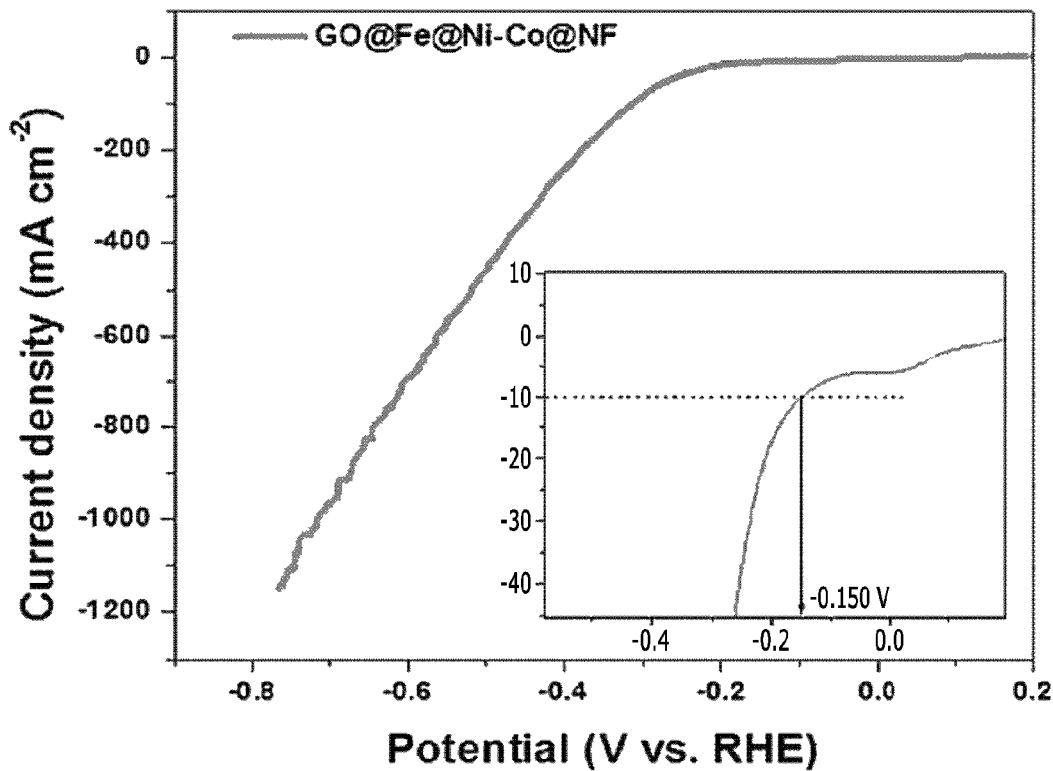
[Fig. 15A]
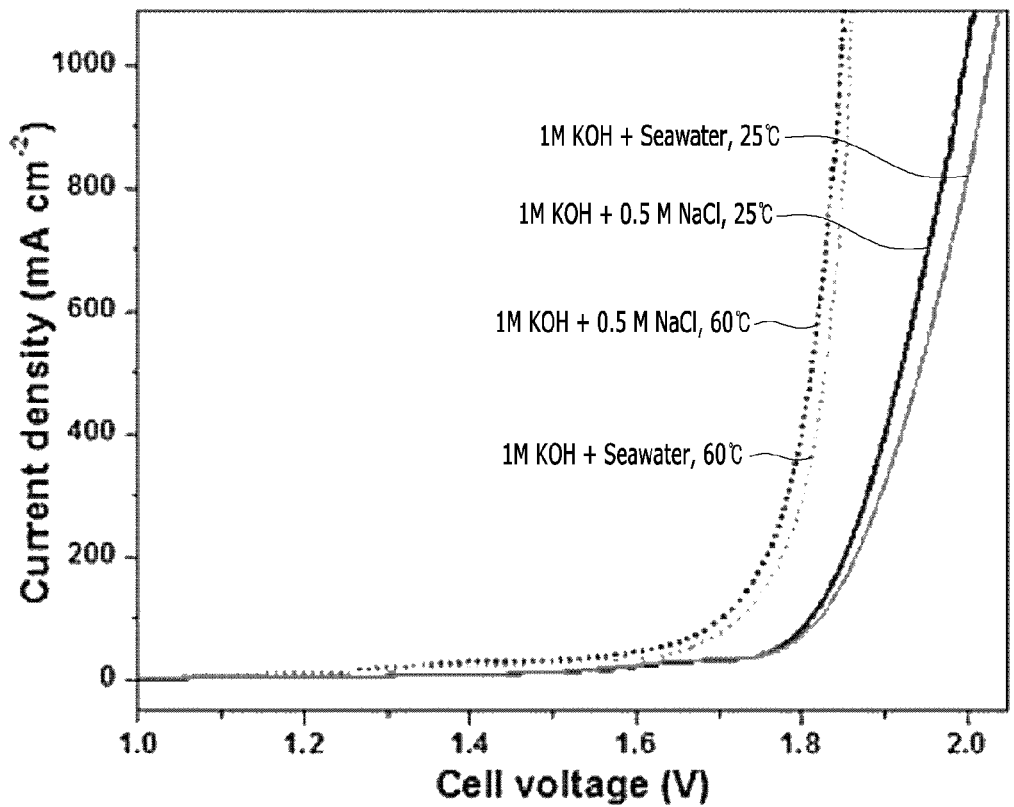

[Fig. 15B]
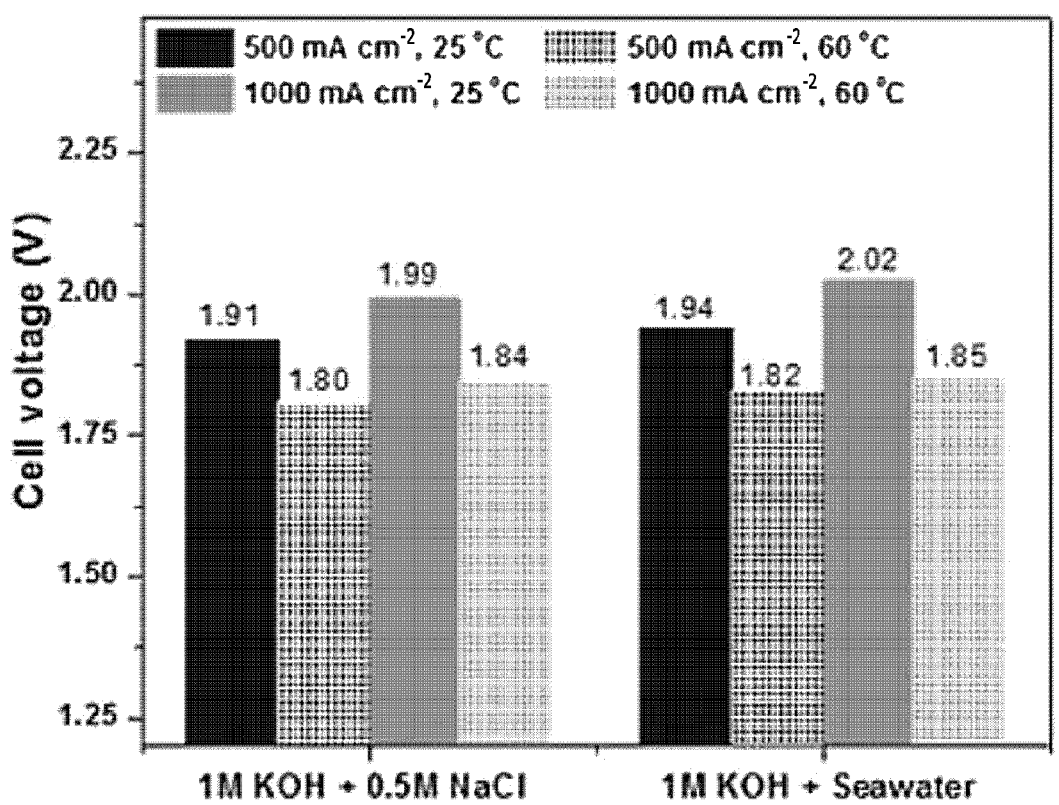

[Fig. 15C]
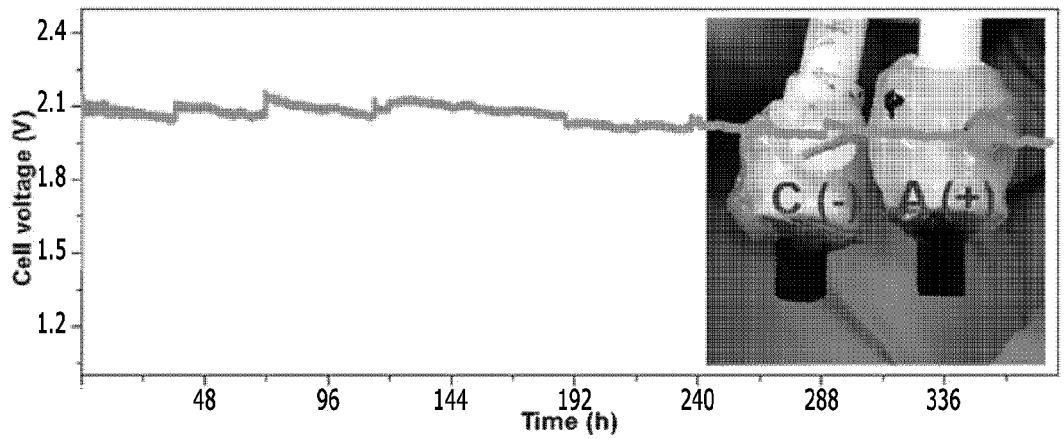
[Fig. 15D]
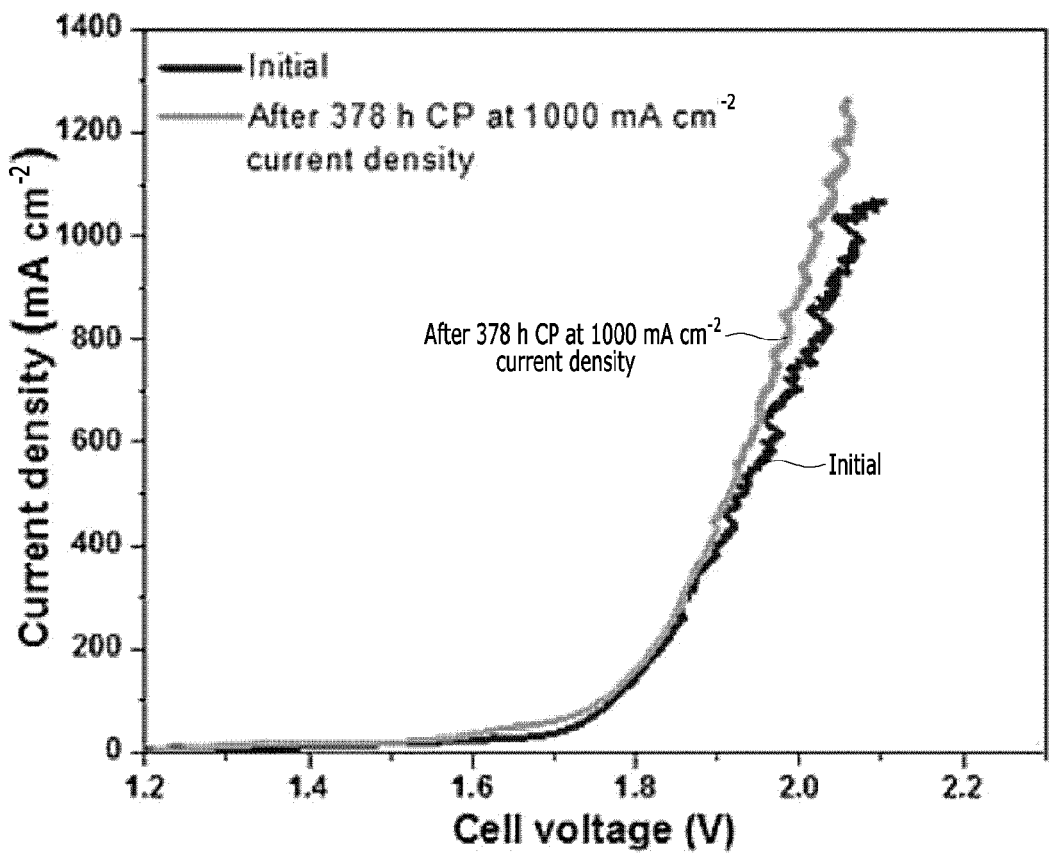

[Fig. 15E]
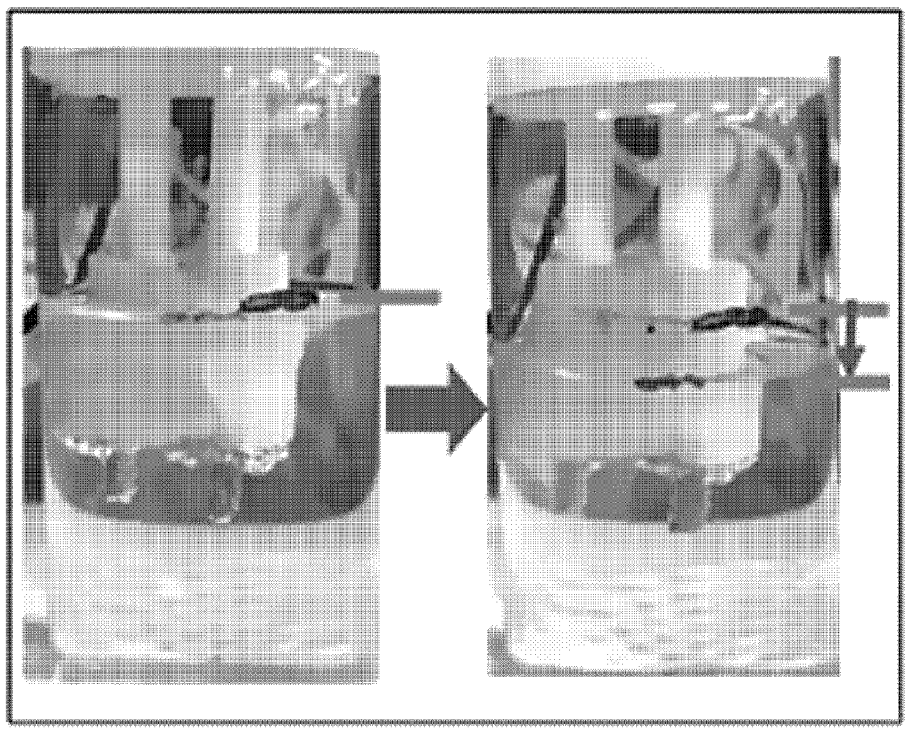
[Fig. 16]
| Electrolyzer | Element Label (nm) | Conc(mg kg$^{-1}$) |
|---|---|---|
| GO@Fe@Ni-Co@NF(+) // GO@Fe@Ni-Co@NF(-) | Co | 0.0104 |
| | Fe | 0.0332 |
| | Ni | 0.0051 |

[Fig. 17A]
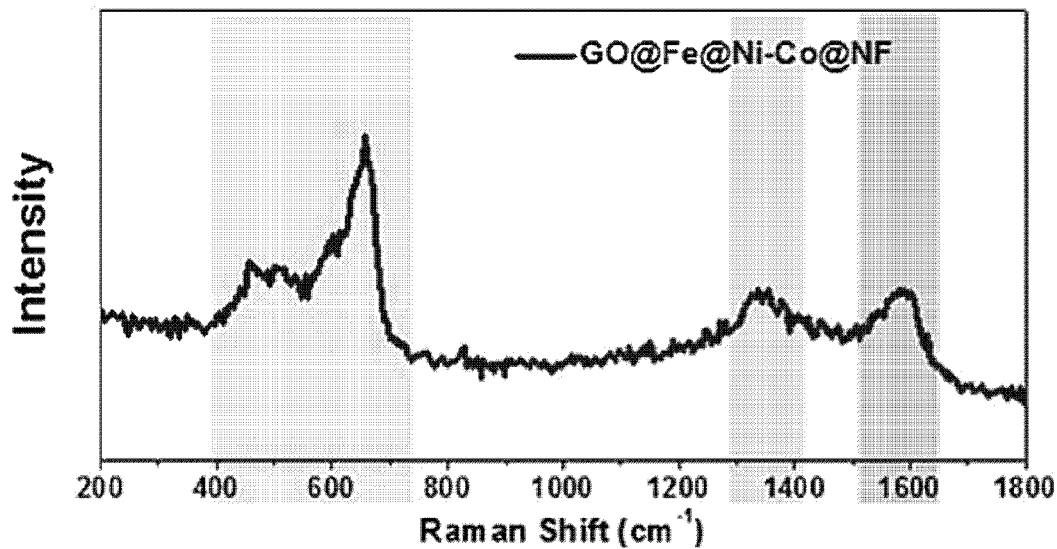
[Fig. 17B]
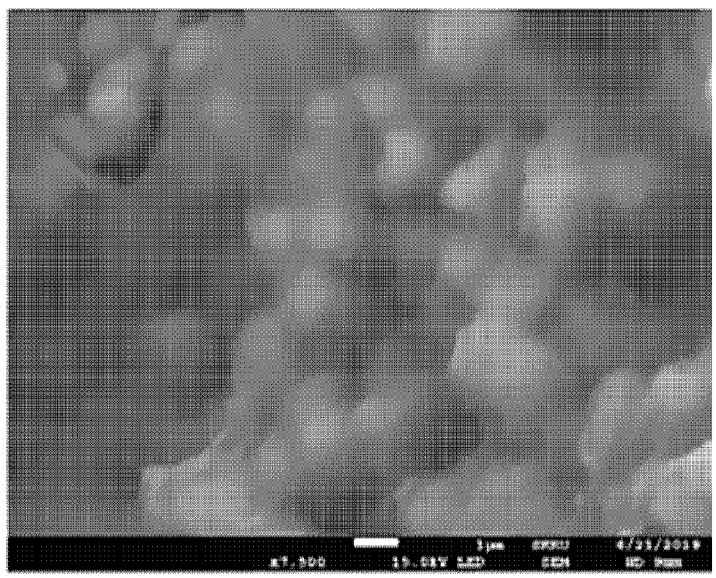

[Fig. 17C]
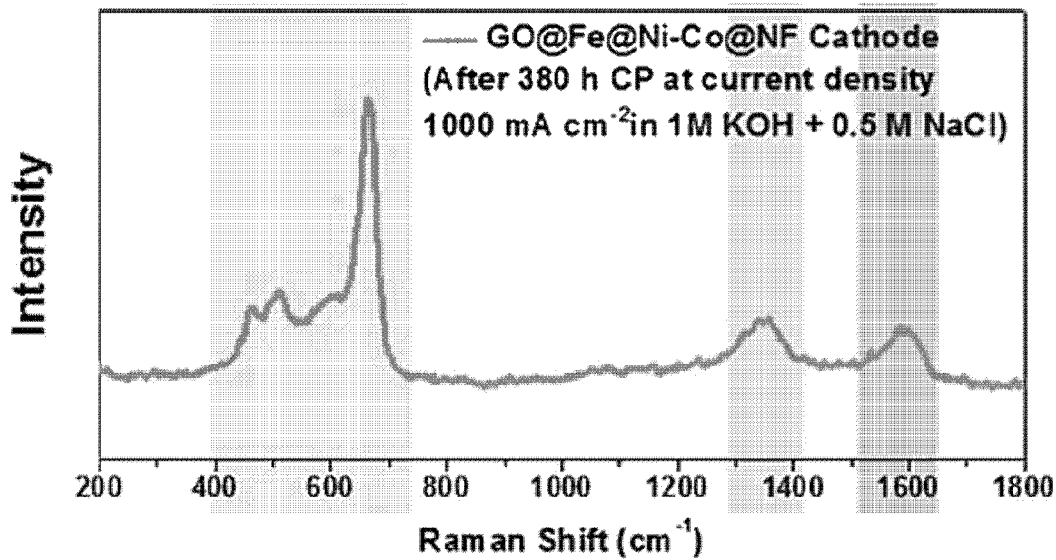
[Fig. 17D]
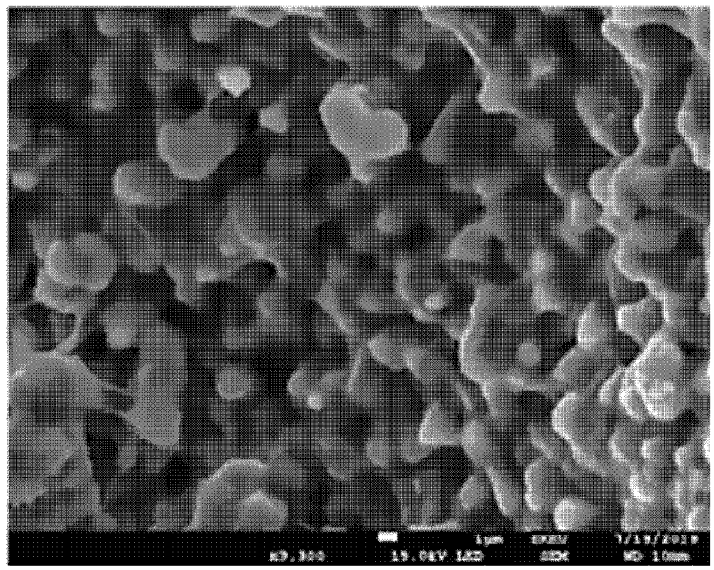

[Fig. 17E]
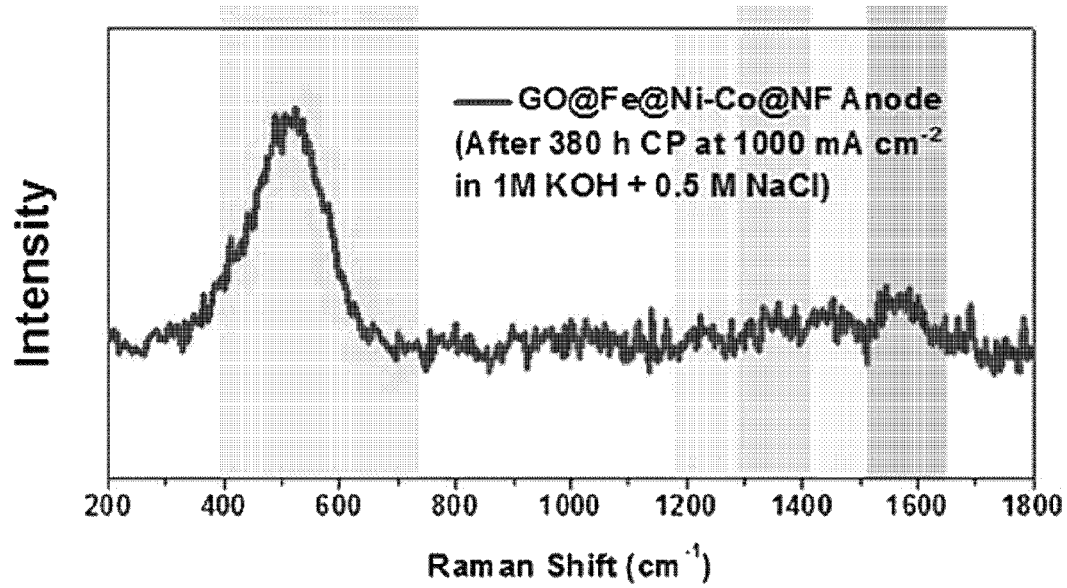
[Fig. 17F]
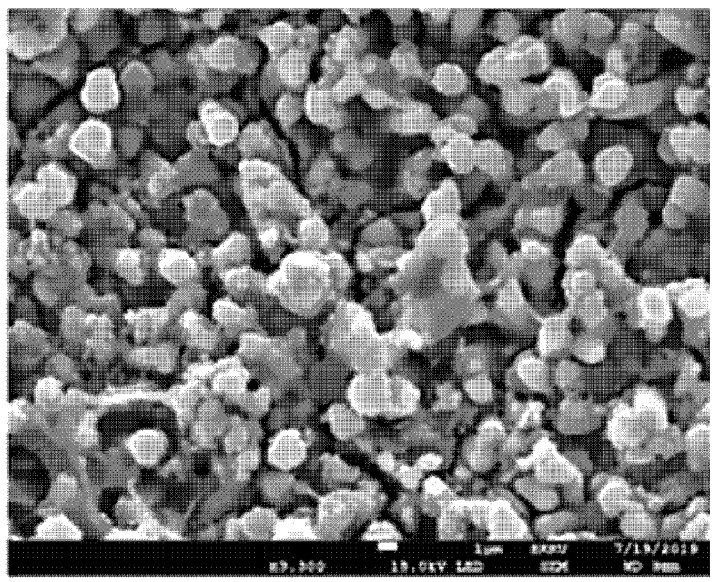

[Fig. 18A]
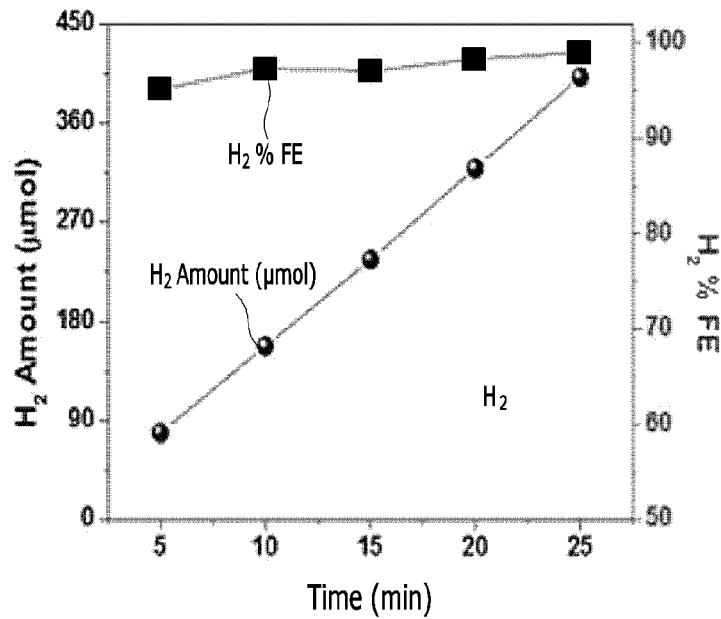
[Fig. 18B]
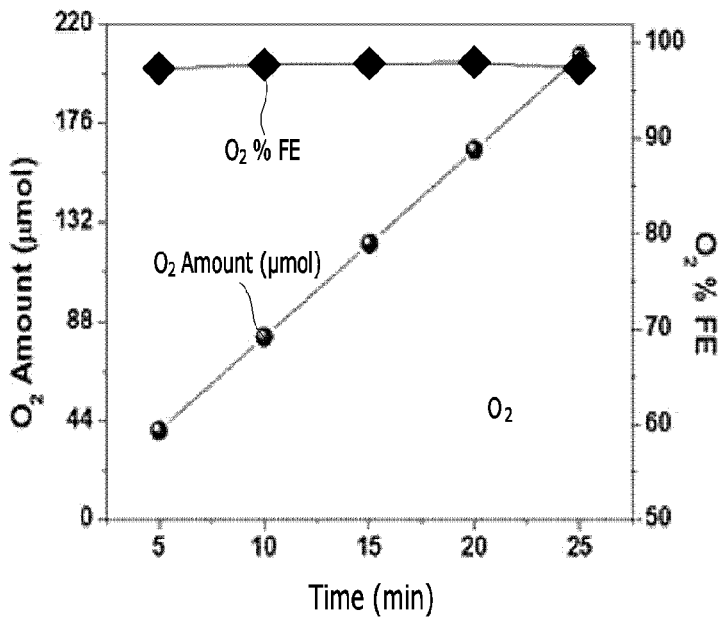

[Fig. 18C]
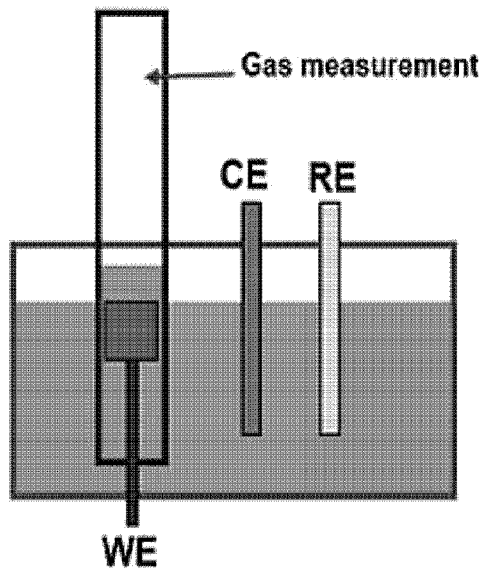
[Fig. 19A]
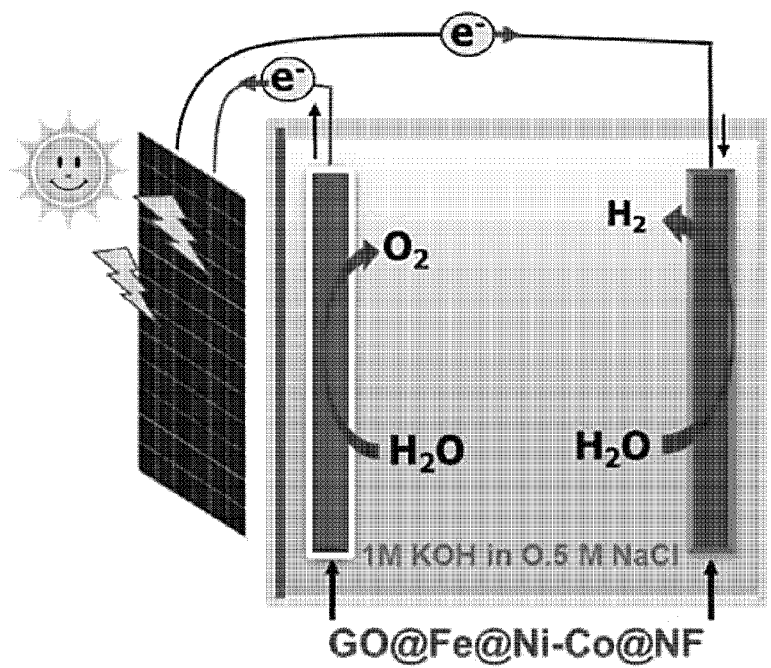

[Fig. 19B]
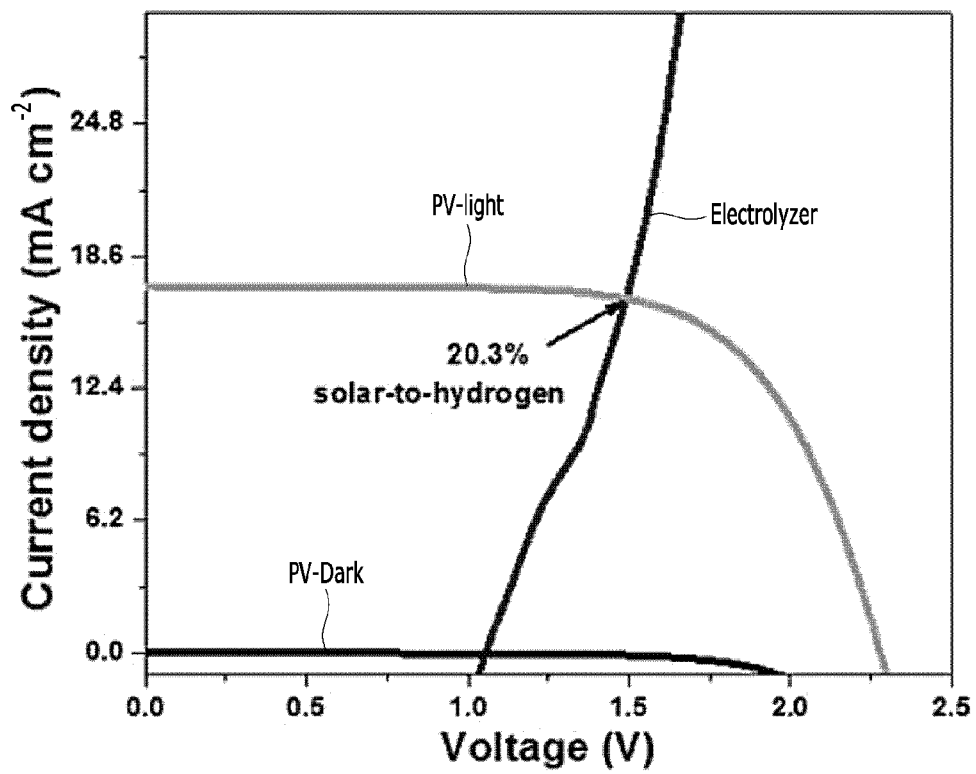
[Fig. 19C]
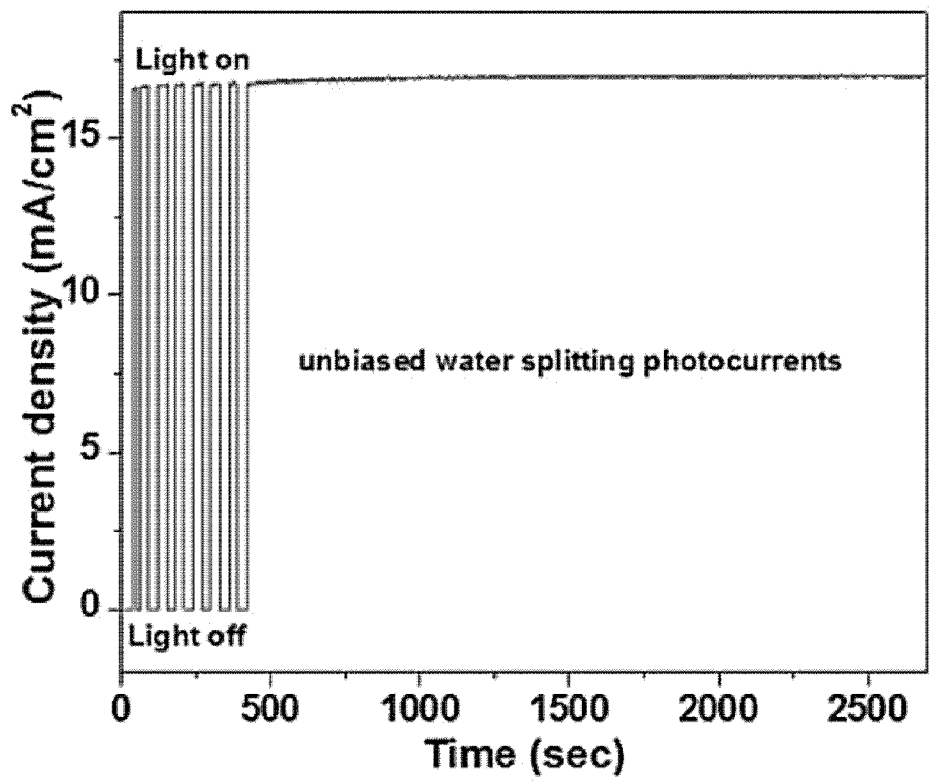

[Fig. 19D]
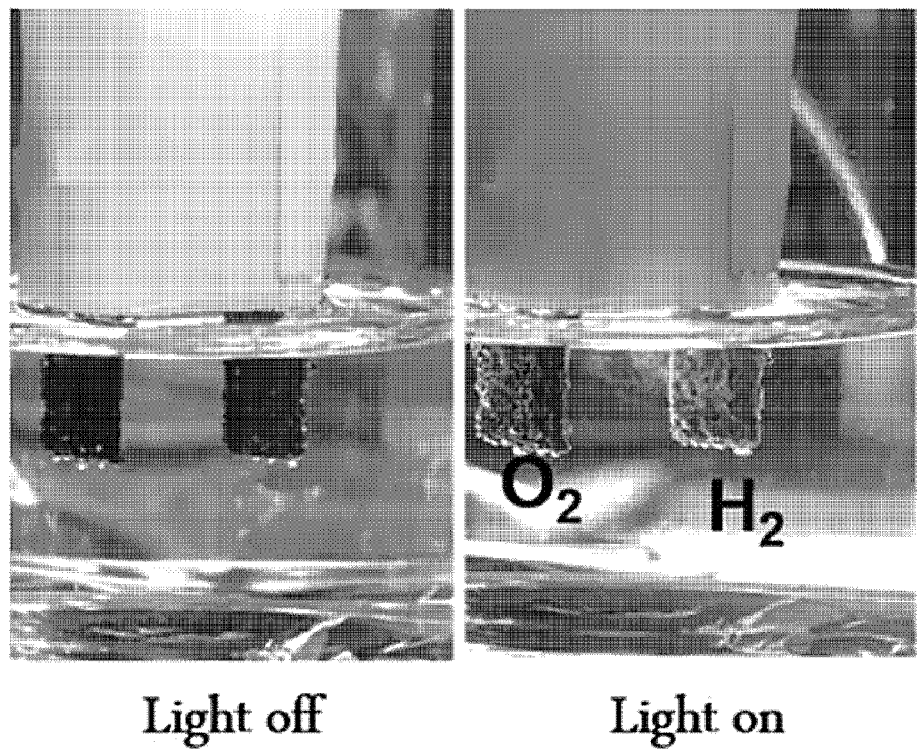
Light off　　　　Light on
[Fig. 20A]
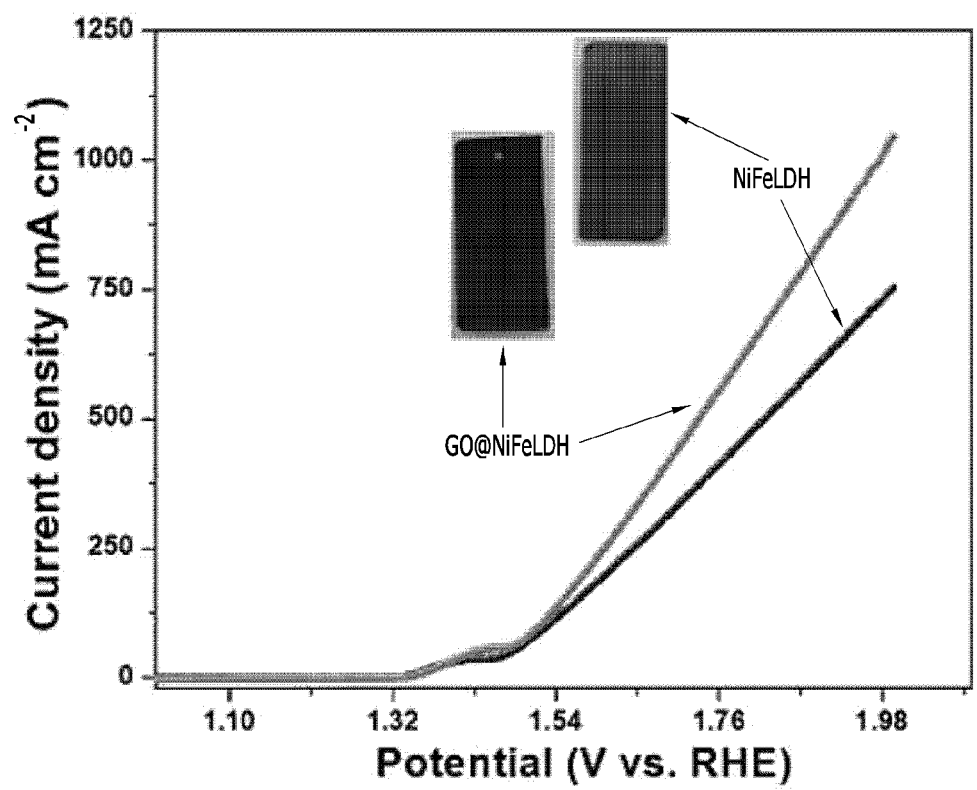

[Fig. 20B]
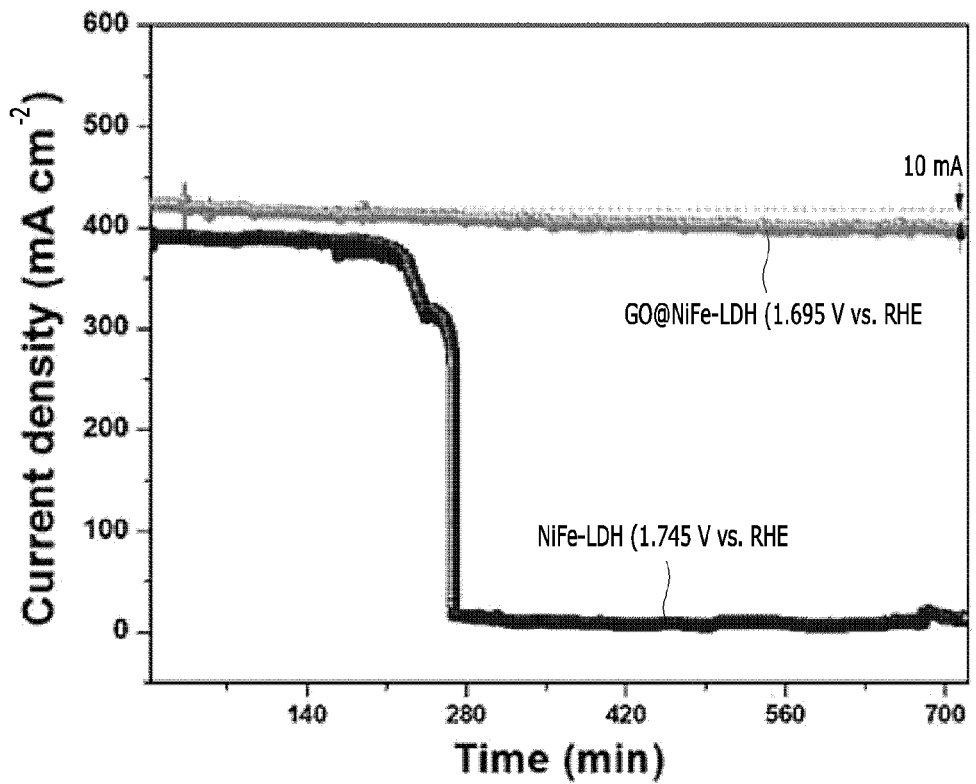
[Fig. 20C]
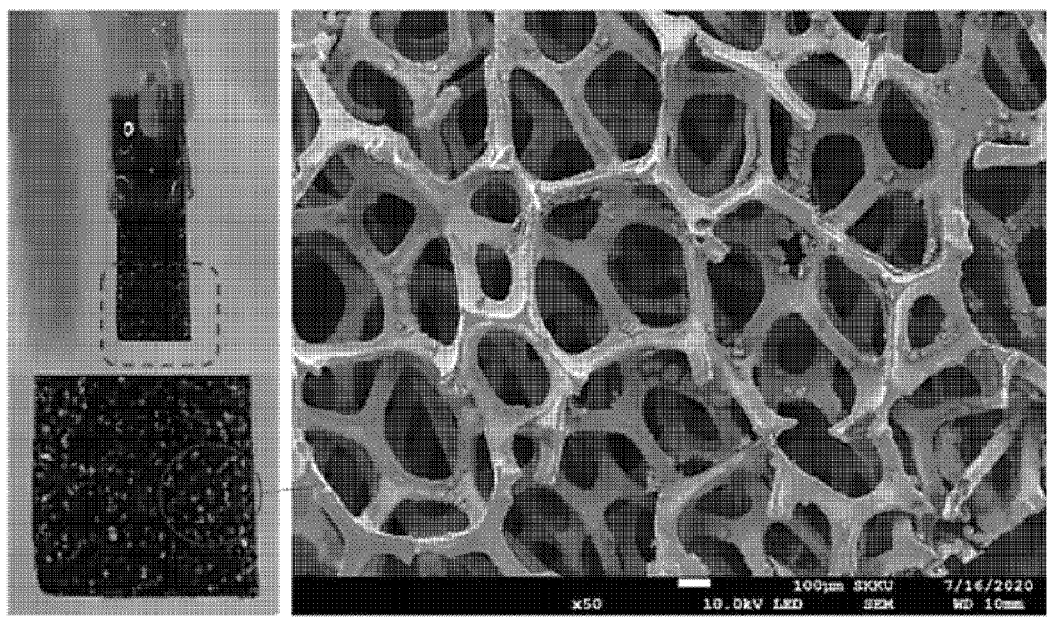

[Fig. 20D]
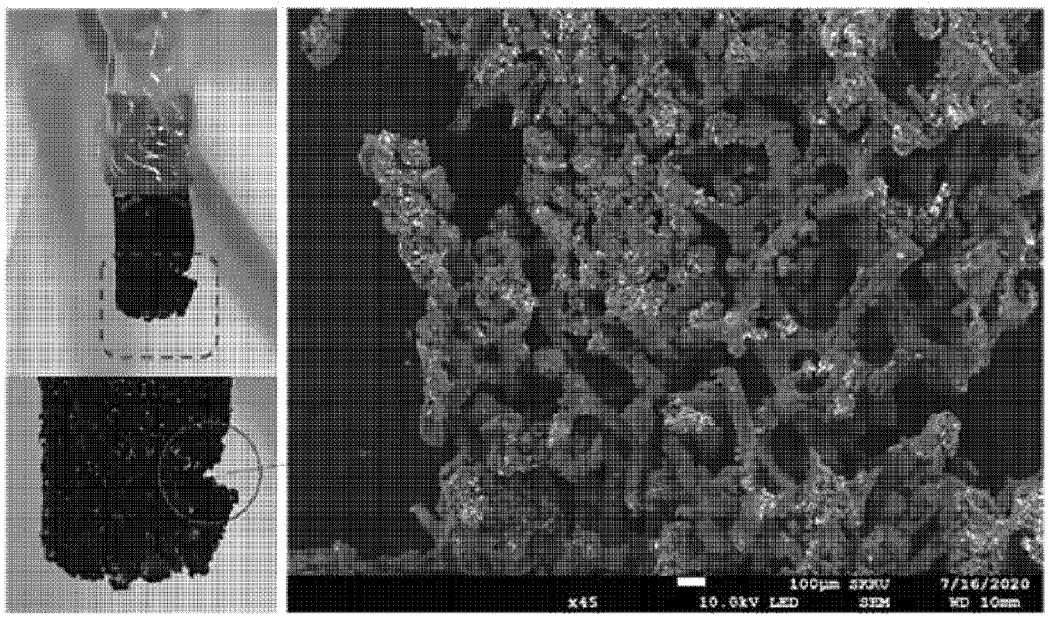

[Fig. 21A]
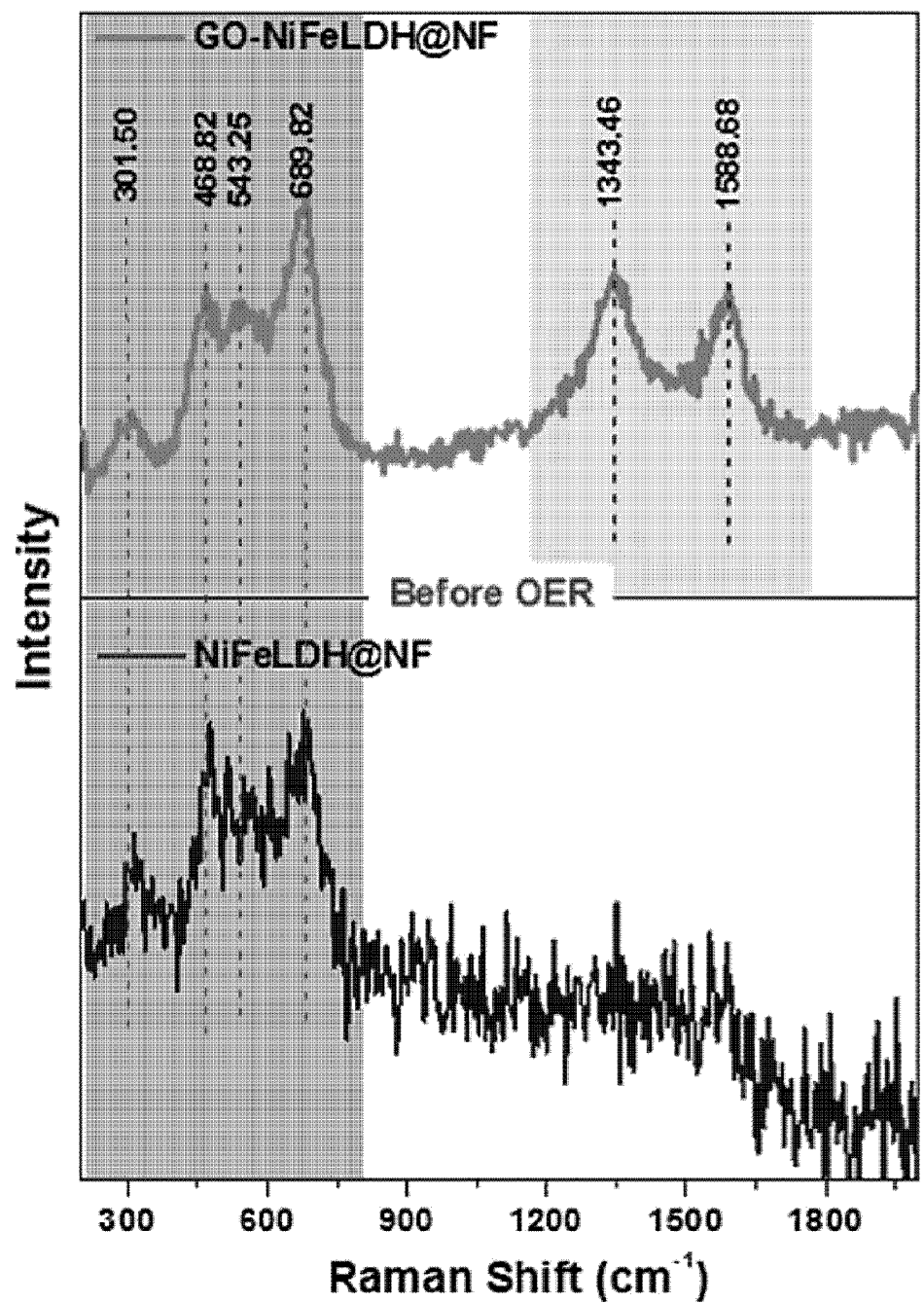

[Fig. 21B]
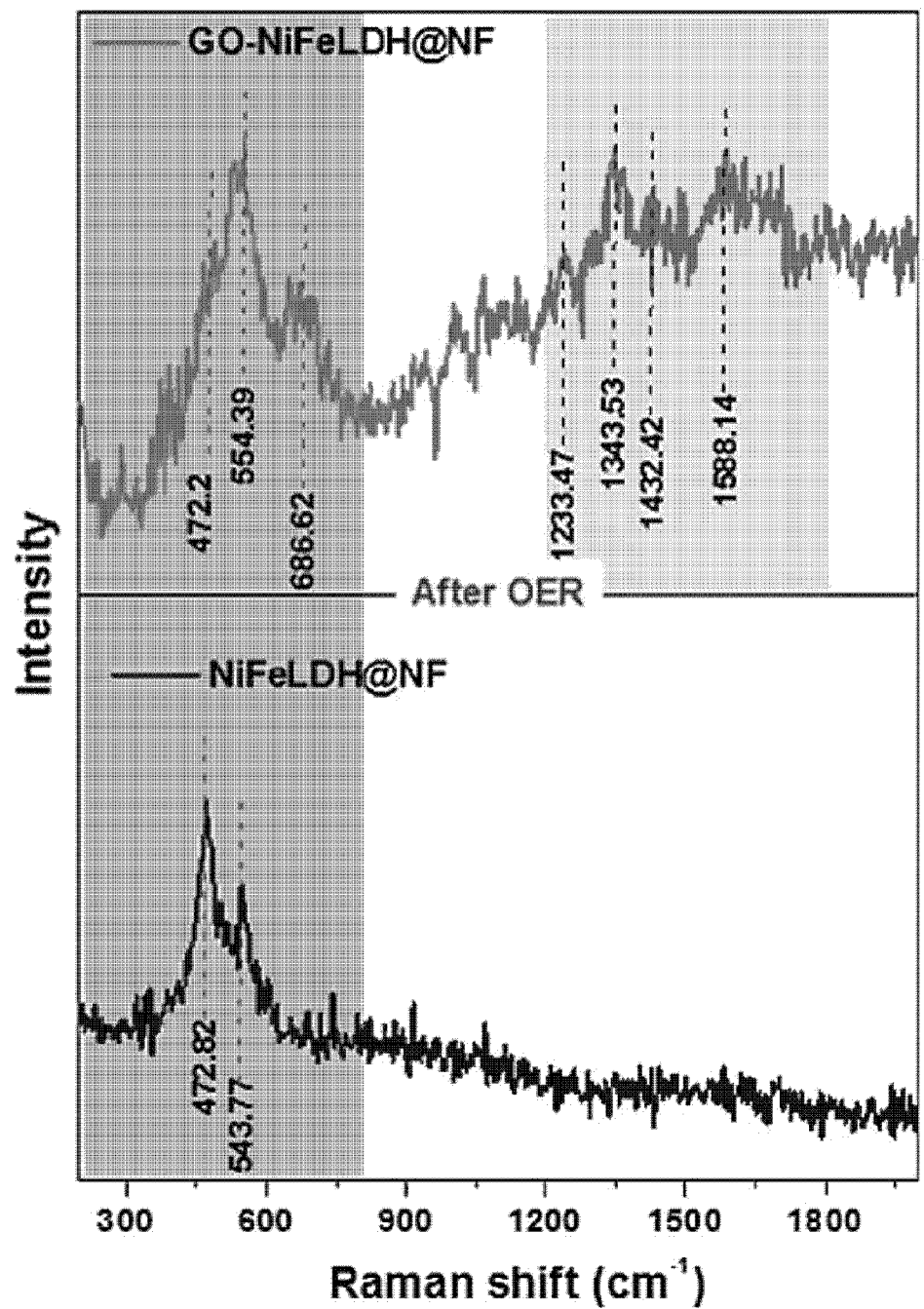

ELECTRODE CATALYST FOR WATER ELECTROLYSIS AND METHOD FOR PREPARING SAME

CROSS REFERENCE TO RELATED APPLICATIONS

This application claims the priority of Korean Patent Application No. 10-2021-0014658 filed on Feb. 2, 2021, in the Korean Intellectual Property Office, the disclosure of which is incorporated herein by reference.

BACKGROUND

Field

The present application relates to an electrode catalyst for water electrolysis and a method for preparing the same.

Description of the Related Art

As an alternative energy source, there is a fuel cell in which hydrogen and oxygen are reacted to obtain water and energy. A fuel cell is a device that generates energy by electrochemically reacting fuel and an oxidizing agent. In general, hydrogen is used as a fuel and oxygen is used as an oxidizing agent.

The fuel cell has a very high power generation efficiency of 40% to 80%, generates less noise during power generation, and requires a small area for power generation. Above all, the by-product of the reaction is water so that it is harmless to the environment. Accordingly, the fuel cell is attracting attention as a next-generation energy device.

In order to commercialize the fuel cell as described above, it is necessary to efficiently supply hydrogen and oxygen that are reactants. A common method for obtaining hydrogen and oxygen is to electrolyze water. However, grid-scale freshwater electrolysis has a limitation in that it may place a great burden on important water resources.

In this regard, seawater is the most abundant natural resource we have on Earth, and it is a new study to find an alternative to freshwater as seawater for hydrogen production by electrolysis. However, the electrolysis of seawater has low stability due to anode corrosion caused by the presence of chloride anions (about 0.5 M) present in seawater. That is, there is a problem in that an anode side reaction such as chloride ion oxidation occurs and mainly competes with an oxygen evolution reaction (OER).

According to the Pourbaix diagram for artificial saline (0.5 M NaCl solution), chloride ion oxidation in the entire pH range is thermodynamically less advantageous than water oxidation reaction. Further, in the high pH (pH>7.5) range, the OER reaction is thermodynamically highly selective within the 480 mV overpotential. Moreover, the hypochlorite formation reaction ($Cl^-+2OH^-\rightarrow ClO^-+H_2O+2e^-$) is an anodic reaction that competes predominantly with the OER reaction at a high pH. The standard potential for hypochlorite formation and OER reaction in a pH range of 7.5 to 14 pH results in a standard potential difference as shown in Equation 1 below at parallel scales.

$$\Delta E = E_{Cl}^0 - E_{OER} = 480 \text{ mV} \quad \text{[Equation 1]}$$

Therefore, it is essential to develop an electrocatalyst capable of generating an industrial current density (1 A $cm^{-2}$) for alkaline seawater decomposition even in an overvoltage range of less than 480 mV, which is one of methods of avoiding the anodic chlorine oxidation reaction.

In this regard, a method of forming a protective layer such as a MnO layer on the surface of the active site of the anode material for the selective OER reaction avoiding the chlorine oxidation reaction has been on the rise. However, the MnO layer has a limitation in that it may not generate a high current density at a low voltage by blocking the OER active site and generating an additional resistance.

Meanwhile, in the case of a catalyst such as a Ni—Fe metal layered double hydroxide, it has been reported to have high OER activity in an alkaline electrolyte, but there is a problem in that it is very unstable at an industrial current density (1 A $cm^{-2}$) so that long-term durability may not be achieved.

Therefore, there is a need to develop inexpensive electrochemical catalysts, electrodes, and electrolytes which have high stability that may continue seawater splitting without chloride corrosion and may produce high current density even at low overvoltage.

Korean Patent Laid-Open Gazette No. 10-2020-0110455, which is the background technology of the present application, relates to a very persistent electrode and electrolyte for splitting salt-containing alkaline and neutral water, and specifically to a corrosion-resistant anode for oxygen evolution reaction in water containing chloride ions and a polyanion-adjusted alkaline seawater electrolyte for hydrogen production by electrolysis, including: (1) a substrate; (2) a passivation layer coating the substrate; and (3) an electrochemical catalyst layer coating the passivation layer. However, it does not disclose an electrode catalyst for water electrolysis including a metal layered double hydroxide (LDH)/metal oxide mixed layer and transition metal oxyhydroxide nanoparticles.

SUMMARY

The present application is to solve the aforementioned problems of the conventional art, and an object of the present application is to provide an electrode catalyst for water electrolysis and a method for preparing the same.

Further, the other object of the present application is to provide a seawater decomposition system including the electrode catalyst for water electrolysis.

However, the technical tasks to be achieved by the example of the present application are not limited to the technical tasks as described above, and other technical tasks may exist.

As a technical means for achieving the above-mentioned technical tasks, a first aspect of the present application provides an electrode catalyst for water electrolysis including a first transition metal foam, a metal layered double hydroxide (LDH)/metal oxide mixed layer which contains a second transition metal and a third transition metal that are formed on the surface of the first transition metal foam, and fourth transition metal oxyhydroxide nanoparticles formed on the surface of the mixed layer, in which the mixed layer surface contains the metal layered double hydroxide.

According to an embodiment of the present application, the electrode catalyst for water electrolysis may further include a chloride ion blocking layer formed on the surface of the catalyst, but the present application is not limited thereto.

According to an embodiment of the present application, the nanoparticles may have a diameter of 1 nm to 6 nm, but the present application is not limited thereto.

According to an embodiment of the present application, the blocking layer may contain a material selected from the group consisting of graphene, graphene oxide, reduced graphene oxide, and combinations thereof, but the present application is not limited thereto.

According to an embodiment of the present application, the blocking layer may have an interlayer spacing of 0.1 nm to 1 nm, but the present application is not limited thereto.

According to an embodiment of the present application, the metal layered double hydroxide may be one which is in a beta-phase (β-phase), but the present application is not limited thereto.

According to an embodiment of the present application, the metal layered double hydroxide and the nanoparticles may have interfacial oxygen bridges formed on the interface therebetween, but the present application is not limited thereto.

According to an embodiment of the present application, the first transition metal to the fourth transition metal may each independently include one selected from the group consisting of Ni, Co, Fe, Cu, W, Mo, Sc, Ti, V, Cr, Mn, Zn, Y, Zr, Nb, Tc, Ru, Rh, Pd, Ag, Cd, Hf, Ta, Re, Os, Ir, Pt, Au, Hg, Rf, Db, Sg, Bh, Hs, Mt, Ds, Rg, Cn, and combinations thereof, but the present application is not limited thereto.

According to an embodiment of the present application, the catalyst may include a three-dimensional porous structure, but the present application is not limited thereto.

According to an embodiment of the present application, the catalyst may be one which is used as an electrode catalyst for oxygen evolution reaction (OER) or hydrogen evolution reaction (HER) in alkaline seawater, but the present application is not limited thereto.

A second aspect of the present application provides a method for preparing an electrode catalyst for water electrolysis, including a first step of forming a metal layered double hydroxide (LDH) including the second transition metal and the third transition metal on the surface of the first transition metal foam by immersing a first transition metal foam in a solution containing a second transition metal and a third transition metal, a second step of forming a metal layered double hydroxide/metal oxide mixed layer by annealing the metal layered double hydroxide, and a third step of forming fourth transition metal oxyhydroxide nanoparticles on the surface of the mixed layer by immersing the mixed layer in a solution containing a fourth transition metal oxyhydroxide precursor.

According to an embodiment of the present application, the third step may further include a step of forming a chloride ion blocking layer, but the present application is not limited thereto.

According to an embodiment of the present application, the step of forming the blocking layer may include a step of immersing the nanoparticles in a solution containing a material selected from the group consisting of graphene, graphene oxide, reduced graphene oxide, and combinations thereof, but the present application is not limited thereto.

According to an embodiment of the present application, the metal layered double hydroxide may be grown in a petal-like shape from the surface of the first transition metal foam, but the present application is not limited thereto.

According to an embodiment of the present application, the metal layered double hydroxide may be converted into a metal oxide layer by annealing it in a temperature range of 100° C. to 400° C., but the present application is not limited thereto.

According to an embodiment of the present application, the annealing step may be performed for 30 minutes to 4 hours, but the present application is not limited thereto.

According to an embodiment of the present application, the third step may be performed by one selected from the group consisting of an electrodeposition method, a coevaporation method, a sputtering method, an RF sputtering method, a DC sputtering method, a reactive sputtering method, an ion beam sputtering method, an evaporation deposition method, a chemical vapor deposition (CVD) method, a low pressure chemical vapor deposition (LPCVD) method, a plasma-enhanced chemical vapor deposition (PECVD) method, an ion plating method, an E-beam evaporation method, a metal organic chemical vapor deposition (MOCVD) method, a molecular beam epitaxy (MBE) method, a screen printing method, a particle deposition method, an atomic layer epitaxy method, and combinations thereof, but the present application is not limited thereto.

A third aspect of the present application provides a seawater decomposition system including the electrode catalyst for water electrolysis according to the first aspect of the present application.

The above-described problem solving means are merely exemplary, and should not be construed as an intention of limiting the present application. In addition to the embodiments described above, additional embodiments may exist in the drawings and detailed description of the invention.

Conventional seawater electrolysis had a limitation in that stability and efficiency were low due to anode corrosion caused by the presence of chloride anions (about 0.5 M) present in seawater, but according to the above-described problem solving means of the present application, the electrode catalyst for water electrolysis according to the present application includes transition metal oxyhydroxide nanoparticles or a chloride ion blocking layer so that an electrode catalyst for water electrolysis that has high stability capable of sustaining seawater splitting efficiently without chloride corrosion and may produce high current density even at low overvoltage may be provided.

Further, since the electrode catalyst for water electrolysis according to the present application includes oxyhydroxide nanoparticles so that the oxyhydroxide nanoparticles may electronically transform the transition metal site of the metal layered double hydroxide to help achieve a high level of oxygen production, an electrocatalyst may be provided, which is without chloride corrosion since it may reach an industrial current density ($1 \text{ A cm}^{-2}$) for alkaline seawater decomposition even in an overvoltage range of less than 480 mV, thereby making chloride oxidation thermodynamically impossible.

Further, in the case of the conventional method of forming a protective layer, such as a MnO layer, on the surface of the active site of the anode material, the MnO layer blocks the OER active site and generates additional resistance so that there has been a limitation in that a high current density at a low voltage may not be produced, but the electrode catalyst for water electrolysis according to the present application may produce a high current density even at a low overvoltage by containing interfacial oxygen bridges on the interface between the metal layered double hydroxide and the transition metal oxyhydroxide nanoparticles.

Further, since the electrode catalyst for water electrolysis according to the present application includes a metal oxide mixed layer, thereby allowing the metal oxide layer to lower the charge transfer resistance of the catalyst, a high current density may be produced even at a low overvoltage.

Further, in the case of a catalyst such as a Ni—Fe metal layered double hydroxide, it has been reported to have high OER activity in an alkaline electrolyte, but it was very unstable at an industrial current density ($1 \text{ A cm}^{-2}$) so that there has been a problem in that long-term durability could not be achieved. However, the electrode catalyst for water electrolysis according to the present application may provide a catalyst with high durability, stability and efficiency, in which there is no chloride corrosion and voltage increase even at industrial current density (1 A cm$^{-2}$) by including a chloride ion blocking layer, thereby covering the active site surface of the anode material with a protective layer.

Further, the electrode catalyst for water electrolysis according to the present application may provide a catalyst having high efficiency by including a chloride ion blocking layer, thereby allowing the chloride ion blocking layer to improve electrical conductivity to contribute to OER activity.

Further, the electrode catalyst for water electrolysis according to the present application includes oxyhydroxide nanoparticles having a diameter of 1 nm to 6 nm, thereby increasing the surface atoms and unsaturation ratio as the particle size of the nanoparticles decreases so that the interfacial interaction between the metal layered double hydroxide and transition metal oxyhydroxide nanoparticles is strengthened to enable the OER catalytic activity to be increased.

Further, the electrode catalyst for water electrolysis according to the present application includes a beta-phase metal layered double hydroxide (interlayer spacing<4.74 Å) having a much lower interlayer spacing than an alpha phase (interlayer spacing>8.0 Å) so that the small interlayer spacing may improve chloride corrosion resistance to seawater oxidation by reducing the intercalation of chloride ions during water oxidation in a chloride-containing electrolyte.

Further, due to the three-dimensional porous structure of the electrode catalyst for water electrolysis according to the present application, microporous pathways are formed in the surface of the catalyst while oxygen is being generated so that molecular oxygen generated from the surface may be efficiently released, and the exposure of several active catalytic sites for OER may be increased.

Further, since the transition metal oxyhydroxide nanoparticles of the electrode catalyst for water electrolysis according to the present application are hydrophilic and diatomic oxygen is hydrophobic, the transition metal oxyhydroxide nanoparticles prefer hydrogen bonding with water or OH$^-$ electrolyte, and since O$^2$ is essentially hydrophobic so that the interaction is very weak, oxygen may be easily separated from the transition metal oxyhydroxide nanoparticles and moved to the reactant.

Further, the electrode catalyst for water electrolysis according to the present application may exhibit excellent HER activity in alkaline seawater.

Further, in the electrode catalyst for water electrolysis according to the present application, since the metal layered double hydroxide is grown in a petal-like shape from the surface of the transition metal foam, the catalyst of a rod-shaped structure having a surface formed by petals may effectively improve the active surface area so that high current density may be produced during the OER/HER reaction.

Further, since the electrode catalyst for water electrolysis according to the present application may use inexpensive non-noble metal elements such as Co, Ni, and Fe, it may be possible to provide a high-performance catalyst at a low price.

Further, since the method for preparing the electrode catalyst for water electrolysis according to the present application may prepare it in an efficient and simple process, the production process may be simplified, it may be prepared even at low cost, the mass production may be easy, and the economical efficiency may be excellent.

However, the effects obtainable in the present application are not limited to the effects as described above, and another effect may exist.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 1A-1N show schematic diagrams of a preparation process of an electrode catalyst for water electrolysis according to one Example of the present application and characteristics of the prepared catalyst;

FIG. 2 is a schematic diagram showing the thermodynamically controlled synthesis process of a Ni—Co hydroxide through thermal relaxation of the DETA-M complex;

FIG. 3 is scanning electron microscope (SEM) images of a Ni—Co hydroxide on the Ni foam synthesized at hydrothermal time intervals of 2 hours, 4 hours, 6 hours, and 8 hours;

FIG. 4 is an X-ray diffraction (XRD) graph showing the formation of a beta mixed type Ni—Co hydroxide;

FIGS. 5A-5B are field emission scanning electron microscopes (FE-SEM) images and energy dispersive X-ray spectroscopy (EDS) data of a Ni—Co hydroxide (4 hour sample);

FIGS. 6A-6C are transmission electron microscope (TEM) images of Ni—Co@NF according to one Example of the present application and images showing element mapping results thereof;

FIG. 7 is a graph showing XRD patterns of an electrode catalyst for water electrolysis according to one Example of the present application;

FIGS. 8A-8B are graphs showing the annealing optimization temperature of a metal hydroxide and the electrodeposition optimization time of FeOOH/GO;

FIGS. 9A-9B are graphs showing the XPS analysis results of an electrode catalyst for water electrolysis according to one Example of the present application;

FIGS. 10A-10I show the structural characteristics of an electrode catalyst for water electrolysis according to one Example of the present application;

FIGS. 11A-11E are graphs measuring the OER performance in alkaline seawater of an electrode catalyst for water electrolysis according to one Example of the present application;

FIG. 12 is a graph showing the Nyquist plots of an electrode catalyst for water electrolysis according to one Example of the present application;

FIG. 13 is a table showing the results of inductively coupled plasma optical emission spectroscopy (ICP-OES) analysis of an electrode catalyst for water electrolysis according to one Example of the present application;

FIG. 14 is a graph showing the hydrogen evolution reaction linear sweep voltammetry (HER LSV) plots of an electrode catalyst for water electrolysis according to one Example of the present application;

FIGS. 15A-15E are graphs showing the alkaline seawater decomposition performance of an electrode catalyst for water electrolysis according to one Example of the present application;

FIG. 16 is a table showing the ICP-OES analysis results of an electrode catalyst for water electrolysis according to one Example of the present application;

FIGS. 17A-17F show the post analysis of the cathode and anode after seawater electrolysis for 378 hours of an electrode catalyst for water electrolysis according to one Example of the present application;

FIGS. 18A-18C show the results of measuring the Faraday efficiency of an electrode catalyst for water electrolysis according to one Example of the present application;

FIGS. 19A-19D show the photolysis of simulated alkaline seawater (1 M KOH in 0.5 M NaCl) of an electrode catalyst for water electrolysis according to one Example of the present application;

FIGS. 20A-20D are graphs showing the characteristics of NiFe-LDH according to one Comparative Example of the present application and a GO@NiFe-LDH@NF catalyst; and FIGS. 21A-21B show Raman spectra before and after the 12-hour OER stability test of NiFe-LDH according to one Comparative Example of the present application and a GO@NiFe-LDH@NF catalyst.

DETAILED DESCRIPTION OF THE EMBODIMENT

Hereinafter, embodiments of the present application will be described in detail with reference to the accompanying drawings so that those with ordinary skill in the art to which the present application pertains will easily be able to implement the present application.

However, the present application may be implemented in various different forms and is not limited to the embodiments described herein. Further, parts irrelevant to the description are omitted in order to clearly describe the present application in the drawings, and similar reference numerals are attached to similar parts throughout the specification.

In the whole specification of the present application, when a part is said to be "connected" with other parts, it not only includes a case that the part is "directly connected" to the other parts, but also includes a case that the part is "electrically connected" to the other parts with another element being interposed therebetween.

In the whole specification of the present application, when any member is positioned "on", "over", "above", "beneath", "under", and "below" other member, this not only includes a case that the any member is brought into contact with the other member, but also includes a case that another member exists between two members.

In the whole specification of the present application, if a prescribed part "includes" a prescribed element, this means that another element may be further included instead of excluding other elements unless any particularly opposite description exists.

When unique manufacture and material allowable errors of numerical values are suggested to mentioned meanings of terms of degrees used in the present specification such as "about", "substantially", etc., the terms of degrees are used in the numerical values or as a meaning near the numerical values, and the terms of degrees are used to prevent that an unscrupulous infringer unfairly uses a disclosure content in which exact or absolute numerical values are mentioned to help understanding of the present application. Further, in the whole specification of the present application, "a step to do ~" or "a step of ~" does not mean "a step for ~".

In the whole specification of the present application, a term of "a combination thereof" included in a Markush type expression, which means a mixture or combination of one or more selected from the group consisting of constituent elements described in the Markush type expression, means including one or more selected from the group consisting of the constituent elements.

In the whole specification of the present application, description of "A and/or B" means "A or B, or, A and B".

Hereinafter, an electrode catalyst for water electrolysis according to the present application and a method for preparing the same will be described in detail with reference to embodiments, examples, and drawings. However, the present application is not limited to such embodiments, examples, and drawings.

As a technical means for achieving the above-mentioned technical tasks, the first aspect of the present application provides an electrode catalyst for water electrolysis including a first transition metal foam, a metal layered double hydroxide (LDH)/metal oxide mixed layer which contains a second transition metal and a third transition metal that are formed on the surface of the first transition metal foam, and fourth transition metal oxyhydroxide nanoparticles formed on the surface of the mixed layer, in which the mixed layer surface contains the metal layered double hydroxide.

Conventional seawater electrolysis had a limitation in that stability and efficiency were low due to anode corrosion caused by the presence of chloride anions (about 0.5 M) present in seawater, but according to the above-described problem solving means of the present application, the electrode catalyst for water electrolysis according to the present application includes transition metal oxyhydroxide nanoparticles or a chloride ion blocking layer so that an electrode catalyst for water electrolysis that has high stability capable of sustaining seawater splitting efficiently without chloride corrosion and may produce high current density even at low overvoltage may be provided.

Further, since the electrode catalyst for water electrolysis according to the present application includes oxyhydroxide nanoparticles so that the oxyhydroxide nanoparticles may electronically transform the transition metal site of the metal layered double hydroxide to help achieve a high level of oxygen production, an electrocatalyst may be provided, which is without chloride corrosion since it may reach an industrial current density (1 A $cm^{-2}$) for alkaline seawater decomposition even in an overvoltage range of less than 480 mV, thereby making chloride oxidation thermodynamically impossible.

Further, since the electrode catalyst for water electrolysis according to the present application includes a metal oxide mixed layer, thereby allowing the metal oxide layer to lower the charge transfer resistance of the catalyst, a high current density may be produced even at a low overvoltage.

According to an embodiment of the present application, the electrode catalyst for water electrolysis may further include a chloride ion blocking layer formed on the surface of the catalyst, but the present application is not limited thereto.

In the case of a conventional catalyst such as a Ni—Fe metal layered double hydroxide, it has been reported to have high OER activity in an alkaline electrolyte, but it was very unstable at an industrial current density (1 A $cm^{-2}$) so that there has been a problem in that long-term durability could not be achieved. However, the electrode catalyst for water electrolysis according to the present application may provide a catalyst with high durability, stability and efficiency, in which there is no chloride corrosion or voltage increase even at the industrial current density (1 A $cm^{-2}$) by including a chloride ion blocking layer, thereby covering the active site surface of the anode material with a protective layer.

Further, the electrode catalyst for water electrolysis according to the present application may provide a catalyst having high efficiency by including a chloride ion blocking layer, thereby allowing the chloride ion blocking layer to improve electrical conductivity to contribute to OER activity.

According to an embodiment of the present application, the nanoparticles may have a diameter of about 1 nm to 6 nm, but the present application is not limited thereto.

For example, the nanoparticles may have a diameter of about 2 nm to 4 nm, but the present application is not limited thereto.

In the case of the nanoparticles, the diameter thereof may be reduced due to the presence of the chloride ion blocking layer, but the present application is not limited thereto.

The electrode catalyst for water electrolysis according to the present application includes oxyhydroxide nanoparticles having a diameter of about 1 nm to 6 nm, thereby increasing the surface atoms and unsaturation ratio as the particle size of the nanoparticles decreases so that the interfacial interaction between the metal layered double hydroxide and transition metal oxyhydroxide nanoparticles is strengthened to enable the OER catalytic activity to be increased.

According to an embodiment of the present application, the blocking layer may include a material selected from the group consisting of graphene, graphene oxide, reduced graphene oxide, and combinations thereof, but the present application is not limited thereto.

For example, the blocking layer may include graphene oxide, but the present application is not limited thereto.

According to an embodiment of the present application, the blocking layer may have an interlayer spacing of about 0.1 nm to 1 nm, but the present application is not limited thereto.

For example, the blocking layer may have an interlayer spacing of about 0.3 nm to 0.7 nm, but the present application is not limited thereto.

When the blocking layer has an interlayer spacing of about 0.3 nm to 0.7 nm, molecules or ions having a diameter of 0.45 nm or less may penetrate through the nanochannel, but a material with a large size is blocked. Accordingly, hydrogen gas and OH$^-$ ions with a small diameter may easily penetrate the blocking layer without interfering with an external blocking layer on the HER active site.

According to an embodiment of the present application, the metal layered double hydroxide may be in a beta-phase (β-phase), but the present application is not limited thereto.

The electrode catalyst for water electrolysis according to the present application includes a beta-phase metal layered double hydroxide (interlayer spacing<4.74 Å) having a much lower interlayer spacing than an alpha phase (interlayer spacing>8.0 Å) so that the small interlayer spacing reduces the intercalation of chloride ions during water oxidation in a chloride-containing electrolyte to enable chloride corrosion resistance to seawater oxidation to be improved.

According to an embodiment of the present application, the metal layered double hydroxide and the nanoparticles may have interfacial oxygen bridges formed on the interface therebetween, but the present application is not limited thereto.

For example, the interfacial oxygen bridges may include metal oxyhydroxide (FeOOH) interfacial oxygen bridges, but the present application is not limited thereto.

In the case of the conventional method of forming a protective layer, such as a MnO layer, on the surface of the active site of the anode material, the MnO layer blocks the OER active site and generates additional resistance so that there has been a limitation in that a high current density at a low voltage may not be produced, but the electrode catalyst for water electrolysis according to the present application may produce a high current density even at a low overvoltage by containing interfacial oxygen bridges on the interface between the metal layered double hydroxide and the transition metal oxyhydroxide nanoparticles.

According to an embodiment of the present application, the first transition metal to the fourth transition metal may each independently include one selected from the group consisting of Ni, Co, Fe, Cu, W, Mo, Sc, Ti, V, Cr, Mn, Zn, Y, Zr, Nb, Tc, Ru, Rh, Pd, Ag, Cd, Hf, Ta, Re, Os, Ir, Pt, Au, Hg, Rf, Db, Sg, Bh, Hs, Mt, Ds, Rg, Cn, and combinations thereof, but the present application is not limited thereto.

Preferably, the first transition metal may be Ni, and the first transition metal foam may be a nickel foam, but the present application is not limited thereto.

Preferably, the second transition metal may be Ni, the third transition metal may be Co, and the metal layered double hydroxide may be Ni—Co LDH, but the present application is not limited thereto.

Preferably, the fourth transition metal may be Fe, and the fourth transition metal oxyhydroxide nanoparticles may be FeOOH, but the present application is not limited thereto.

Since the electrode catalyst for water electrolysis according to the present application may use inexpensive non-noble metal elements such as Co, Ni, and Fe, it may be possible to provide a high-performance catalyst at a low price.

According to an embodiment of the present application, the catalyst may include a three-dimensional porous structure, but the present application is not limited thereto.

Due to the three-dimensional porous structure of the electrode catalyst for water electrolysis according to the present application, microporous pathways are formed in the surface of the catalyst while oxygen is being generated so that molecular oxygen generated from the surface may be efficiently released, and the exposure of several active catalytic sites for OER may be increased.

Further, since the transition metal oxyhydroxide nanoparticles of the electrode catalyst for water electrolysis according to the present application are hydrophilic and diatomic oxygen is hydrophobic, the transition metal oxyhydroxide nanoparticles prefer hydrogen bonding with water or OH$^-$ electrolyte, and since O$_2$ is essentially hydrophobic, the interaction is very weak so that oxygen may be easily separated from the transition metal oxyhydroxide nanoparticles and moved to the reactant.

According to an embodiment of the present application, the catalyst may be one which is used as an electrode catalyst for oxygen evolution reaction (OER) or hydrogen evolution reaction (HER) in alkaline seawater, but the present application is not limited thereto.

The electrode catalyst for water electrolysis according to the present application may exhibit excellent HER activity in alkaline seawater.

The second aspect of the present application provides a method for preparing an electrode catalyst for water electrolysis, including a first step of forming a metal layered double hydroxide (LDH) including the second transition metal and the third transition metal on the surface of the first transition metal foam by immersing a first transition metal foam in a solution containing a second transition metal and a third transition metal, a second step of forming a metal layered double hydroxide/metal oxide mixed layer by annealing the metal layered double hydroxide, and a third step of forming fourth transition metal oxyhydroxide nanoparticles on the surface of the mixed layer by immersing the mixed layer in a solution containing a fourth transition metal oxyhydroxide precursor.

With respect to the method for preparing the electrode catalyst for water electrolysis of the second aspect of the present application, detailed descriptions of parts overlapping with the first aspect of the present application have been omitted, but even if the descriptions have been omitted, the contents described in the first aspect of the present application may be equally applied to the second aspect of the present application.

Since the method for preparing the electrode catalyst for water electrolysis according to the present application may prepare it in an efficient and simple process, the production process may be simplified, it may be prepared even at low cost, the mass production may be easy, and the economical efficiency may be excellent.

According to an embodiment of the present application, the third step may further include a step of forming a chloride ion blocking layer, but the present application is not limited thereto.

According to an embodiment of the present application, the step of forming the blocking layer may include a step of immersing the nanoparticles in a solution containing a material selected from the group consisting of graphene, graphene oxide, reduced graphene oxide, and combinations thereof, but the present application is not limited thereto.

According to an embodiment of the present application, the metal layered double hydroxide may be grown in a petal-like shape from the surface of the first transition metal foam, but the present application is not limited thereto.

In the electrode catalyst for water electrolysis according to the present application, since the metal layered double hydroxide is grown in a petal-like shape from the surface of the transition metal foam, the catalyst of a rod-shaped structure having a surface formed by petals may effectively improve the active surface area so that high current density may be produced during the OER/HER reaction.

According to an embodiment of the present application, the metal layered double hydroxide may be converted into a metal oxide layer by performing annealing in a temperature range of about 100° C. to 400° C., but the present application is not limited thereto.

For example, the metal layered double hydroxide may be annealed in a temperature range of about 100° C. to 300° C., but the present application is not limited thereto.

Specifically, the metal oxide phase begins to form in a temperature range of about 100° C. to 250° C., and when the temperature rises, the metal oxide phase becomes dominant.

The annealing step may be performed in an inert atmosphere, but the present application is not limited thereto.

For example, the inert atmosphere may be an argon atmosphere, but the present application is not limited thereto.

Since the method for preparing the electrode catalyst for water electrolysis according to the present application may prepare the metal layered double hydroxide/metal oxide of a mixed phase only by controlling the annealing temperature in an inert atmosphere, the preparation process is simple and efficient.

According to an embodiment of the present application, the annealing step may be performed for about 30 minutes to 4 hours, but the present application is not limited thereto.

Preferably, the annealing step may be performed for about 2 to 4 hours, but the present application is not limited thereto.

When the annealing step exceeds about 4 hours, additional precipitation of the metal layered double hydroxide occurs to block the three-dimensional network of the first transition metal foam so that the annealing time has a very important meaning.

According to an embodiment of the present application, the third step may be performed by one selected from the group consisting of an electrodeposition method, a coevaporation method, a sputtering method, an RF sputtering method, a DC sputtering method, a reactive sputtering method, an ion beam sputtering method, an evaporation deposition method, a chemical vapor deposition (CVD) method, a low pressure chemical vapor deposition (LPCVD) method, a plasma-enhanced chemical vapor deposition (PECVD) method, an ion plating method, an E-beam evaporation method, a metal organic chemical vapor deposition (MOCVD) method, a molecular beam epitaxy (MBE) method, a screen printing method, a particle deposition method, an atomic layer epitaxy method, and combinations thereof, but the present application is not limited thereto.

For example, the third step may be performed by an electrodeposition method, but the present application is not limited thereto.

The third aspect of the present application provides a seawater decomposition system including the electrode catalyst for water electrolysis according to the first aspect of the present application.

With respect to the seawater decomposition system of the third aspect of the present application, detailed descriptions of parts overlapping with the first and second aspects of the present application have been omitted, but even if the descriptions have been omitted, the contents described in the first and second aspects of the present application may be equally applied to the third aspect of the present application.

Hereinafter, the present disclosure will be described in more detail through Examples, but the following Examples are for explanation purposes only and are not intended to limit the scope of the present application.

[Example 1] Preparation of Ni—Co@NF

A nickel foam (NF) was sonicated with conc. The nickel oxide layer on the surface thereof was removed using HCL for 3 minutes, washed with DI water, isopropanol, and acetone, and then dried in air.

Subsequently, after immersing three NF pieces (size 1×2.5 cm) in 100 mL of DI water in a beaker, 24 mmol of DETA was added to the solution, and the solution was maintained for 15 minutes.

Subsequently, 4 mmol of $Co(NO_3)$ 2.6 $H_2O$ and 2 mmol of $Ni(NO_3)$ 2.6 $H_2O$ were added to the solution and the solution was sonicated for 15 minutes. After maintaining the solution for 3 hours, 50 mL of a 1 M KOH solution was added thereto. Subsequently, the mixture was transferred to a 120 mL pressure sealed glass bottle and heated at 120° C. for 2 hours, 4 hours, 6 hours, and 8 hours for Ni—Co-Hydroxide deposition optimization.

Subsequently, the bottle was air-cooled to room temperature, and the resultant was filtered through washing with distilled water. Subsequently, it was vacuum dried at 60° C. for 5 hours to obtain a Ni—Co layered double hydroxide having a Co:Ni ratio of about 1:0.12.

Subsequently, the product was annealed at 300° C. in an argon atmosphere (heating rate of 3° C./min) for 2 hours to obtain Ni—Co@NF containing a metal layered double hydroxide (LDH)/metal oxide mixed layer of a mixed phase (load: 1.8 mg cm$^{-2}$).

[Example 2] Preparation of Fe@Ni—Co@NF

The electrodeposition of FeOOH on Ni—Co@NF of Example 1 was performed in a standard three-electrode electrochemical cell. Specifically, Ni—Co@NF as a working electrode, Ag/AgCl (1 M KCl) as a reference electrode, and a Pt wire as a counter electrode were used in an electrochemical bath containing Fe(NO$_3$)$_3$.9H$_2$O (0.003 M). The deposition potential was continuously controlled at Ag/AgCl vs. −1.0 V for 500 seconds. The composite electrode obtained after deposition was washed with deionized water and ethanol, and then dried in air to prepare an Fe@Ni—Co@NF electrode.

[Example 3] Preparation of GO@Fe@Ni—Co@NF

Ni—Co@NF of Example 1 was immersed in a solution containing graphene oxide (GO) and Fe(NO$_3$)$_3$.9H$_2$O (GO 1 mg/ml, 0.003 M Fe(NO$_3$)$_3$.9H$_2$O in water) at intervals of 1 hour and 3 hours respectively.

The electrodeposition of GO and FeOOH was performed in a standard three-electrode electrochemical cell. Specifically, Ni—Co@NF as a working electrode, Ag/AgCl (1 M KCl) as a reference electrode, and a Pt wire as a counter electrode were used in an electrochemical bath containing Fe(NO$_3$)$_3$.9H$_2$O (0.003 M) and graphene oxide (1 mg/mL) in DI water (50 mL). The deposition potentials were continuously controlled at Ag/AgCl vs. −1.0 V for 300, 500, and 900 seconds. The composite electrode obtained after deposition was washed with deionized water and ethanol, and then dried in air to prepare a GO@Fe@Ni—Co@NF electrode.

[Comparative Example 1] Preparation of Ni—Co$_3$O$_4$@NF

Ni—Co$_3$O$_4$@NF was prepared by annealing the Ni—Co layered double hydroxide of Example 1 at 500° C. in an air atmosphere for 3 hours (load: 1.8 mg cm$^{-2}$).

[Comparative Example 2] Preparation of NiFe@NF

The electrodeposition of NiFe-LDH on a nickel foam was performed in a standard three-electrode electrochemical cell. Specifically, Ni—Co@NF as a working electrode, Ag/AgCl (1 M KCl) as a reference electrode, and a Pt mesh as a counter electrode were used in an electrolyte containing 0.04 M Ni(NO$_3$)$_2$.6H$_2$O and 0.04 M Fe(NO$_3$)$_3$9H$_2$O in 50 mL of water. The deposition potential was continuously controlled at Ag/AgCl vs. −1.0 V for 500 seconds. The composite electrode obtained after deposition was washed with deionized water, and then dried in air to prepare NiFe@NF (load: 1.9 mg cm$^{-2}$).

[Comparative Example 3] Preparation of GO@NiFe@NF

NiFe@NF of Comparative Example 2 was immersed in a solution containing graphene oxide (1 mg/ml of GO in water). The electrodeposition of GO was performed in a standard three-electrode electrochemical cell. Specifically, NiFe@NF as a working electrode, Ag/AgCl (1 M KCl) as a reference electrode, and a Pt wire as a counter electrode were used in an electrochemical bath containing 0.5 mg/mL of graphene oxide in a phosphate buffer of 7 pH. The deposition potential was continuously controlled at Ag/AgCl vs. −1.0 V for 500 seconds.

Experimental Example 1

FIGS. 1A-1N show schematic diagrams of a preparation process of an electrode catalyst for water electrolysis according to one Example of the present application and characteristics of the prepared catalyst.

Specifically, FIG. 1A is a schematic diagram of the synthesis procedure for the preparation of GO@Fe@Ni—Co@NF of Example 3 (II: Ni—Co hydroxide@NF, III: Ni—Co@NF of Example 1, IV: GO@Fe@Ni—Co@NF of Example 3).

FIGS. 1B and 1C are FE-SEM images of Ni—Co@NF of Example 1, and FIGS. 1D and 1E are TEM images of Ni—Co@NF of Example 1.

FIGS. 1F and 1G are FE-SEM images of Fe@Ni—Co@NF of Example 2, and FIGS. 1H and 1I are TEM images of Fe@Ni—Co@NF of Example 2.

FIGS. 1J and 1K are FE-SEM images of GO@Fe@Ni—Co@NF of Example 3, and FIGS. 1L and 1M are TEM images of GO@Fe@Ni—Co@NF of Examples 3.

FIG. 1N is TEM images of GO@Fe@Ni—Co@NF of Example 3 and images showing the mapping results of the corresponding elements of Fe, Co, and Ni.

Though FIG. 1D, it could be confirmed that the ultra-thin sheet covered a structure similar to a microrod in the TEM image of Ni—Co@NF of Example 1.

Though FIG. 1I, in the case of Fe@Ni—Co@NF of Example 2, a uniform deposit of FeOOH nanoparticles having an average diameter of 7 nm to 9 nm could be confirmed on the surface of the Ni—Co sheet.

Interestingly, through FIG. 1M, in the case of GO@Fe@Ni—Co@NF of Example 3, the size of FeOOH nanoparticles in the Ni—Co sheet could be confirmed to be much smaller (2 nm to 4 nm) than that of Example 2. The reduced size of FeOOH may be due to the GO layer, which may limit the permeation of Fe ions into the Ni—Co sheet during electroprecipitation.

Through FIG. 1J, the uniform coating of GO could be confirmed in GO@Fe@Ni—Co@NF of Example 3.

Through FIG. 1N, the uniform distribution of FeOOH nanoparticles could be further confirmed in the Ni—Co sheet of GO@Fe@Ni—Co@NF of Example 3.

FIG. 2 is a schematic diagram showing the thermodynamically controlled synthesis process of a Ni—Co hydroxide through thermal relaxation of the DETA-M complex.

Spontaneous formation of metal diethylenetriamine (DETA) complexes occurs, and the cage type complex of M$^{2+}$ (Co/Ni) ions may withstand strong alkaline environments due to hydroxide precipitation at room temperature. When the complex alkaline solution is heated, DETA ligand relaxation occurs so that OH$^−$ ions freely approach to M$^{2+}$ ions to slow the nucleation and growth of metal hydroxides.

Through this, it could be confirmed that the mixed type Ni—Co hydroxide was first synthesized using the hydrothermal method by controlling the growth of the metal hydroxide using a metal-chelate complex.

FIG. 3 is SEM images of a Ni—Co hydroxide on the Ni foam synthesized at hydrothermal time intervals of 2 hours, 4 hours, 6 hours, and 8 hours.

Through this, the formation of microrod arrays could be seen on the surface of the Ni foam after 2 hours, and it could be confirmed that the petal-like shaped Ni—Co hydroxide was secondarily grown as the hydrothermal reaction time increased (4 hours). Such a rod-shaped structure with a surface formed by petals may effectively improve the active surface area of the catalyst, and this suggests that it is very important for generating high current densities of OER/HER.

FIG. 4 is an XRD graph showing the formation of a beta mixed type Ni—Co hydroxide.

Specifically, in situ XRD measurements were performed during annealing of Ni—Co-hydroxide (4 hours) samples under vacuum conditions in a temperature range of 26° C. to 500° C. in order to optimize the annealing temperature.

Through this, it could be confirmed that the metal oxide phase started to form after 250° C. and the metal oxide phase became dominant when the temperature was increased, and the successful formation of Ni—Co hydroxide was confirmed by XRD data showing the formation of the beta mixed type Ni—Co hydroxide.

FIGS. 5A-5B are FE-SEM images and EDS data of a Ni—Co hydroxide (4 hour sample).

Through this, it could be confirmed that the approximate atomic ratio of Co:Ni was 1:0.12.

FIG. 6A-6C are a TEM image of Ni—Co@NF according to one Example of the present application and images showing element mapping results thereof.

FIG. 6A is a HR-TEM image of Ni—Co@NF of Example 1, and FIGS. 6B and 6C are images showing the element mapping results of TEM-EDS of Ni—Co@NF of Example 1.

Specifically, in order to achieve both metal hydroxide and metal oxide phases, Ni—Co hydroxide samples were annealed at 300° C. in an Ar atmosphere for 2 hours and analyzed by TEM and XRD measurements.

Through this, it could be confirmed that the outer layer of the microrods of Ni—Co@NF remained as a metal hydroxide layer.

Through FIG. 6A, the layered structure of the Ni—Co hydroxide could be confirmed. An interlayer spacing of 0.474 nm was observed, and this is consistent with the XRD result.

Through FIGS. 6B and 6C, the uniform distribution of all elements could be confirmed.

FIG. 7 is a graph showing XRD patterns of an electrode catalyst for water electrolysis according to one Example of the present application.

Through this, it could be confirmed that the metal oxide and metal hydroxide phases existed as a mixed phase. Due to the small size of the FeOOH nanoparticles, the peak corresponding to FeOOH was not detected.

FIGS. 8A-8B are graphs showing the annealing optimization temperature of a metal hydroxide and the electrodeposition optimization time of FeOOH/GO.

Through this, the OER performance of the metal hydroxide/metal oxide mixed phase Ni—Co@NF catalyst in alkaline seawater could be confirmed to be significantly higher than that of the metal oxide (Ni—Co$_3$O$_4$@NF of Comparative Example 1) or metal hydroxide (Ni—Co hydroxide@NF) catalyst.

FIGS. 9A-9B are graphs showing the XPS analysis results of an electrode catalyst for water electrolysis according to one Example of the present application.

Through this, the presence of Ni, Co, and O in Ni—Co@NF could be confirmed.

Experimental Example 2

FIGS. 10A-10I show the structural characteristics of an electrode catalyst for water electrolysis according to one Example of the present application.

Specifically, FIGS. 10A to 10C are graphs showing Co 2p (FIG. 10A), Ni 2p (FIG. 10B), and Fe 2p (FIG. 10C) XPS spectra of the GO@Fe@Ni—Co@NF electrode of Example 3, FIGS. 10D to 10F are graphs showing Co 2p (FIG. 10D), Ni 2p (FIG. 10E), and Fe 2p (FIG. 10F) XPS spectra of the Fe@Ni—Co@NF catalyst of Example 2, and FIG. 10G and FIG. 10H are graphs showing Co 2p (FIG. 10G) and Ni 2p (FIG. 10H) XPS spectra of the Ni—Co@NF catalyst of Example 1.

FIG. 10I is a schematic diagram of the interfacial interaction through the formation of an oxygen bridge (Fe—O—Co).

Through this, a positive change in the binding energy in which the positive shift in binding energy in the high-resolution Co 2p XPS spectra of the Fe@Ni—Co@NF and GO@Fe@Ni—Co@NF catalysts indicated a strong electronic interaction between Ni—Co hydroxides could be confirmed compared to the Ni—Co @ NF catalyst. Further, it could be confirmed that the oxidation of Co$^{2+}$ in Ni—Cold LDH could be effectively promoted by highly oxidized interface Fe$(^{3+})^+$ species in unsaturated FeOOH nanoparticles. In the case of Fe@Ni—Co@NF catalyst, Ni 2p binding energy was not observed, and this means that the growth of FeOOH is mostly on the Co (II) side (FIG. 10I). It could be confirmed that an interfacial oxygen bridge such as a Fe—O—Co couple was formed at the interface of FeOOH and Ni—Co hydroxide, and the Co 2p shift was higher for the GO@Fe@Ni—Co@NF catalyst than for the Fe@Ni—Co@NF catalyst.

As may be seen from the Co 2p XPS spectra of the Fe@Ni—Co@NF and GO@Fe@Ni—Co@F catalysts, it could be confirmed that the Co sites were electronically modified by Fe atoms so that they indicated much improved OER activities than bare Ni—CO@NF as a result.

Experimental Example 3

FIGS. 11A-11E are graphs measuring the OER performance in alkaline seawater of an electrode catalyst for water electrolysis according to one Example of the present application.

FIG. 11A is a graph showing LSV curves, and FIG. 11B is a graph showing Tafel plots.

The OER performance of all catalyst materials was measured with an alkaline simulated seawater electrolyte (1 M KOH+0.5 M NaCl) using a three-electrode configuration. Ni—Co@NF and Fe@Ni—Co@NF catalysts do not have a graphene oxide coating, and GO@Ni—Co@NF and GO@Fe@Ni—Co@NF have a graphene oxide overlay. As shown in the LSV curves of FIG. 11A, the Ni—Co@NF and Fe@Ni—Co@NF catalysts generate 50 mA cm$^{-2}$ current at overpotentials of 313 mV and 246 mV respectively, and they required 401 mV and 312 mV in comparison with the potentials in order to generate 500 mA cm$^{-2}$. Interestingly, GO@Ni—Co@NF and GO@Fe@Ni—Co@NF using the graphene oxide overlay could be confirmed to have slightly more excellent performance than electrodes without a GO overlay. It could be confirmed that the GO@Ni—Co@NF catalyst required 307 mV and 398 mV respectively for 50 mA cm$^{-2}$ and 500 mA cm$^{-2}$ current densities, and the GO@Fe@Ni—Co@NF catalyst required 247 mV and 303 mV respectively for 50 mA cm$^{-2}$ and 500 mA cm$^{-2}$ current densities.

FIG. 11B shows a Tafel figure of the corresponding catalyst. The Tafel slope of the GO@Fe@Ni—Co@NF catalyst is relatively small compared to those of Fe@Ni—Co@NF (105 mV dec$^{-1}$), Ni—Co@NF (103 mV dec$^{-1}$) and GO@Ni—Co@NF (94 mV dec$^{-1}$) catalysts. This demonstrates the rapid OER catalytic kinetics in GO@Fe@Ni—Co@NF.

FIG. 11C is a graph showing Chronopotentiometric (CP) curves, FIG. 11D is a graph comparing OER overvoltages before and after the CP test, FIG. 11E is an image showing the structure model of the outermost layer of the Fe@Ni—Co@NF catalyst, and FIG. 11F is an image showing the structure model of the outermost layer of the GO@Fe@Ni—Co@NF catalyst including a GO layer.

Catalyst durability to OER of simulated alkaline seawater was tested using chronopotential atmospheric pressure (CP) at an industrial current density (1,000 mA cm$^{-2}$).

FIG. 11C is a graph showing Chronopotentiometric (CP) curves at a current density of 1,000 mA cm$^{-2}$ for 12 hours in simulated alkaline seawater of Fe@Ni—Co@NF and GO@Fe@Ni—Co@NF.

Through this, the advantage of a GO overlay could be confirmed. The catalyst with the GO layer was very stable under harsh conditions, and no corrosion or voltage increase was observed.

Through the LSV curves after the 12-hour stability test of FIG. 11D, it could be confirmed that the catalyst was very stable at 500 mA cm$^{-2}$ and 1,000 mA cm$^{-2}$ current densities, and only 293 mV and 318 mV were required for the potential. A change in overvoltage lowering may occur due to the formation of microporous pathways on the catalyst surface during O$_2$ evolution, which may increase the exposure of the number of active catalytic sites for OER.

Conversely, in the CP drawing of Fe@Ni—Co@NF of FIG. 11C, it may be seen that the catalyst is unstable under severe conditions during seawater oxidation since an increasing voltage was observed over time.

Through the LSV curves after the 12-hour CP test of Fe@Ni—Co@NF of FIG. 11D, it could be confirmed that the catalyst without the GO layer required high potentials of 393 mV and 494 mV respectively in order to reach the densities of 500 mA cm$^{-2}$ and 1000 mA cm$^{-2}$.

This suggests that both the GO@Fe@Ni—Co@NF and Fe@Ni—Co@NF catalysts reach the desired industrial Faraday current density (1,000 mA cm$^{-2}$) at an overvoltage of less than 480 mV, which means that chloride oxidation in both catalysts is thermodynamically impossible. Further, according to the Pourbaix diagram, it could be confirmed that the OER activity was significantly improved after the introduction of FeOOH on the Ni—Co@NF surface. This suggests that Fe species at the interface along with Ni and Co hydroxides are important for achieving a high level of oxygen production.

Through FIGS. 11E and 11F, it could be confirmed that seawater oxidation might occur efficiently without chloride corrosion at high current density by installing a GO overlay on the catalyst surface.

FIG. 12 is a graph showing the Nyquist plots of an electrode catalyst for water electrolysis according to one Example of the present application.

Through this, it could be confirmed that the R$_{CT}$ values of both materials decreased after the introduction of GO, indicating that the electrical conductivity of the catalyst was improved after the introduction of the GO layer. It could be confirmed that GO contributed to the improvement of OER activity by improving electrical conductivity.

FIG. 13 is a table showing the results of ICP-OES analysis of an electrode catalyst for water electrolysis according to one Example of the present application.

The decrease in OER performance may occur due to corrosion of the anode surface at high polarization, leading to leaching of active metals in the electrolyte. The ICP-OES analysis was used in the confirmation of the concentration of metal ions dissolved in the electrolyte 12 hours after the CP test.

Through this, it could be confirmed that the dissolved ion concentrations of Co, Ni, and Fe were 0.0391 ppm, 0.0015 ppm, and 0.0293 ppm respectively in the case of the Fe@Ni—Co@NF catalyst, but the concentrations of Co and Ni metal ions dissolved in the electrolyte were very low in the case of the GO@Fe@Ni—Co@NF electrode. These results strongly indicate that the corrosion resistance of the anode to seawater may be effectively improved by disposing the graphene oxide overlay on the catalyst surface.

Experimental Example 4

FIG. 14 is a graph showing the HER LSV plots of an electrode catalyst for water electrolysis according to one Example of the present application.

Through this, it could be confirmed that the GO@Fe@Ni—Co@NF catalyst of Example 3 exhibited high HER activity.

FIGS. 15A-15E are graphs showing the alkaline seawater decomposition performance of an electrode catalyst for water electrolysis according to one Example of the present application.

FIG. 15A is a graph showing the polarization curves for Go@Fe@NiCo@NF$^{(+)}$//Go@Fe@NiCo@NF$^{(-)}$ electrolytic solutions at 500 mA cm$^{-2}$ and 1,000 mA cm$^{-2}$ current densities, and FIG. 15B is a graph comparing the required voltages for the Go@Fe@NiCo@NF$^{(-)}$//Go@Fe@NiCo@NF$^{(-)}$ electrolytic solutions at 500 mA cm$^{-2}$ and 1,000 mA cm$^{-2}$ current densities.

FIG. 15C is a graph showing the results of performing a durability test for 378 hours in a 1 M KOH+0.5 M NaCl seawater decomposition electrolyzer at 1,000 mA cm$^{-2}$ current density.

FIG. 15D shows the polarization curve at 1,000 mA cm$^{-2}$ current density in simulated alkaline seawater after 378 hours of the CP test.

FIG. 15E shows the volume decrease of the electrolyte over time (total electrolyte volume of 75 mL).

Specifically, the overall seawater splitting performance was further investigated by incorporating two-electrode alkaline electrolytes (without membrane or diaphragm), where GO@Fe@Ni—Co@NF was used. For both cathode and anode, the electrolytic solution performance was measured at 25° C. and 60° C. using different electrolytic solution feeds.

Through FIG. 15A, it could be confirmed that the cell voltages required to generate 20, 500, and 1,000 mA cm$^{-2}$ current densities at room temperature (25° C.) of 1 M KOH+0.5 M NaCl were low to be 1.59, 1.91, and 1.99 V respectively.

Through FIG. 15B, it could be confirmed in the case of alkaline natural seawater (1 M KOH+seawater) that the electrolytic solution performance was slightly low, but still good, and only 1.94 and 2.02 V cell voltages were required in order to provide 500 mA cm$^{-2}$ and 1000 mA cm$^{-2}$ current densities. Further, the performance of artificial and natural alkaline seawater electrolytic solutions was further tested at 60° C., it could be confirmed that 20, 500, and 1,000 mA cm$^{-2}$ current densities in artificial alkaline seawater were achieved at 1.30, 1.80, and 1.84V cell voltages respectively, and it could be confirmed in the case of the natural alkaline seawater electrolytic solution that 1.36, 1.82, and 1.85 V cell voltages were required for 20, 500, and 1,000 mA cm$^{-2}$ current densities at 60° C. The slight decrease in activity in 1 M KOH+seawater may be due to insoluble precipitates (e.g., $Mg(OH)_2$ or $Ca(OH)_2$) formed on the electrodes.

The long-term durability of the seawater electrolytic solutions at industrial current densities is very important for practicalization. Through FIG. 15C, it could be confirmed that the durability of the G@Fe@Ni—Co@NF(+)/GO@Ni—Co@NF(−) electrolytic solution tested in alkaline artificial seawater (1 M KOH+0.5 M NaCl) could exhibit excellent stability for overall seawater splitting in a state that it did not remarkably deteriorate even after 378 hours had passed. After the stability test, the LSV spectra were recorded (FIG. 15D). It could be confirmed that chloride oxidation products were not found in the electrolyte in the o-tolidine test even after the 378-hour stability test. This means that OER is the only reaction that occurs on the anode surface.

Through FIG. 15E, the decrease in the amount of electrolyte could be confirmed to be known as the electrolysis time increased since $H_2O$ was rapidly converted into $O_2$ and $H_2$. A slight increase in electrolyzer performance was observed at high current densities, and the improved performance may be due to the improved microporous channels through the carbon layer during $H_2/O_2$ outgassing in the high current density stability test, which improves electrolyte contact to active sites.

FIG. 16 is a table showing the ICP-OES analysis results of an electrode catalyst for water electrolysis according to one Example of the present application.

Specifically, the amount of metal ions dissolved in the electrolyte after the stability test of 378 hours was analyzed by ICP-OES.

Through this, the dissolved metal ion concentrations could be confirmed to be very low as the amounts of Co, Ni, and Fe of 0.0104 ppm, 0.0051 ppm, and 0.0332 ppm respectively, and this means that the anode and cathode electrodes show excellent corrosion resistance to alkaline seawater under these harsh conditions.

Experimental Example 5

FIGS. 17A-17F show the post analysis of the cathode and anode after seawater electrolysis for 378 hours of an electrode catalyst for water electrolysis according to one Example of the present application.

FIGS. 17A and 17B show the Raman spectrum (FIG. 17A) and FE-SEM image (FIG. 17B) of the GO@Fe@Ni—Co@NF electrode.

Through FIG. 17A, the characteristic D bands of graphene oxide could be confirmed at 1,339 $cm^{-1}$ and 1,588 $cm^{-1}$ respectively. The two bands centered at 458 $cm^{-1}$ and 523 $cm^{-1}$ are associated with the Ni—O/Co—O and Ni—O/Co—O stretching modes of LDH, and the FeOOh/LDH composite indicates additional characteristic bands of 594 $cm^{-1}$ and 658 $cm^{-1}$.

FIGS. 17C and 17D show the Raman spectrum (FIG. 17C) and FE-SEM image (FIG. 17D) of the GO@Fe@Ni—Co@NF cathode electrode after 378 hours of testing at 1,000 mA $cm^{-2}$ current density.

Through FIG. 17C, no significant change was observed in the Raman spectrum of the cathode electrode after the continuous electrolytic solution test for 370 hours. It could be confirmed that Ramand and G bands of graphene were still present at 1,347 $cm^{-1}$ and 1,588 $cm^{-1}$, and the GO layer on the cathode electrode surface acted as a sieve to effectively block Cl⁻ and Na⁺ ions and to enable penetration of HO⁻ ions and $H_2$ gas.

Through FIG. 17D, the FE-SEM image of the cathode electrode could confirm that no significant change occurred on the catalyst surface since the GO layer was still present even after 378 hours of testing.

FIGS. 17E and 17F show the Raman spectrum (FIG. 17E) and FE-SEM image (FIG. 17F) of the anode electrode of GO@Fe@Ni—Co@NF after 378 hours of testing at 1,000 mA $cm^{-2}$ current density.

On the contrary, a huge change was observed in the Raman spectrum of the anode electrode after 378 hours of testing. The peak in FIG. 17E corresponds to FeOOH, and the range at the center of 515 $cm^{-1}$ for Ni—Co hydroxide is widened. These changes are changes that may occur since FeOOH is partially dissolved in the KOH electrolytic solution during OER and an amorphous mixed metal oxyhydroxide film is formed on the catalyst surface during OER. A new Raman peak together with these changes appeared at 1,225 $cm^{-1}$, indicating that the properties of carbon became the atypical state. The peak at 1,432 $cm^{-1}$ indicates the strain oscillation mode of the O—H group, and this confirms the higher oxidation of graphene oxide during water oxidation. The graphene fingerprint D and G band peak intensities were also shown to be low. The intensities of the G and D bands may be due to the removal of the non-adhered GO film from the catalyst surface, which may be confirmed in FIG. 17F.

Experimental Example 6

FIGS. 18A-18C show the results of measuring the Faraday efficiency of an electrode catalyst for water electrolysis according to one Example of the present application.

In real-time seawater electrolysis operations, salts are more likely to accumulate in the electrolyte since water is converted to hydrogen and oxygen when seawater is continuously supplied to the system. Considering this possible scenario, the Faraday efficiency (FE) of $H_2$ and $O_2$ in a high concentration NaCl solution (1 M KOH+1 M NaCl) was calculated.

The FE of the GO@Fe@Ni—Co@NF catalyst was measured using a three-electrode configuration by collecting a gaseous product produced over a working electrode. $H_2$ gas with a molar ratio of close to 1:2 was identified even in NaCl (1 M) with a very high concentration of 02 only. The FE was determined to be about up to 99% and up to 97% for $H_2$ and $O_2$ respectively at 200 mA $cm^{-2}$ current density. These results prove high selectivity for OER at the anode and HER at the cathode.

FIGS. 19A-19D show the photolysis of simulated alkaline seawater (1 M KOH in 0.5 M NaCl) of an electrode catalyst for water electrolysis according to one Example of the present application.

FIG. 19A is a schematic diagram of a solar cell-driven seawater splitter.

FIG. 19B is a two-electrode configuration of the J-V curves of a Si solar cell under simulated AM 1.5G illumination and the polarization curve of a GO@Fe@Ni—Co@NF(+)//GO@Fe@Ni—Co@NF(−) seawater splitter.

FIG. 19C is the current density-time curve of the seawater splitter integrated under chopped simulated AM 1.5G illumination.

FIG. 19D is digital images of the electrolyzer with or without illumination.

A coupled photoelectrolysis system is an effective method of generating hydrogen using a carbon-free energy source. In order to prove this, a commercial Si solar cell (power conversion efficiency of 26.53%) was used in the electrolytic solution (GO@Fe@Ni—Co@NF).

The combined system as anode and cathode confirmed the spontaneous production of $H_2$ and $O_2$ under simulated 1.5G solar irradiation at room temperature.

As shown in FIG. 19B, the expected operating current density (16.7 mA cm$^{-2}$) of the photolysis system was estimated at the intersection point of the LSV curve of the electrolysis device and the J-V curve of the solar cell.

The current density recorded under chopped simulated solar illumination is 16.70 mA cm$^{-2}$ (FIG. 19C), indicating a solar hydrogen efficiency of 20.3% in the case of alkaline seawater splitting.

Experimental Example 7

FIGS. 20A-20D are graphs showing the characteristics of NiFe-LDH according to one Comparative Example of the present application and a GO@NiFe-LDH@NF catalyst.

FIG. 20A is a graph showing the LSV spectra of NiFe-LDH and GO@NiFe-LDH@NF catalyst (1 M KOH+2 M NaCl at 5 mV sec$^{-1}$ scan rate at 25° C.)

FIG. 20B is a graph showing the three-electrode durability test results of NiFe-LDH and GO@NiFe-LDH catalyst (in 1 M KOH+2 M NaCl at 25° C.)

NiFeOxHy layered double hydroxide (NiFe-LDH) was synthesized on a nickel foam, one of the OER electrocatalysts, in order to show a broad perspective of this concept for improving the stability of the anode for alkaline seawater oxidation at high current density. A graphene oxide overlay was electrodeposited thereon. The OER performance of the two electrodes was tested under very severe conditions (1 M KOH+2 M NaCl, salt concentration 4 times higher than actual seawater) using a three-electrode assembly (FIG. 20A). LDH@NF without a graphene oxide-NiFe overlay persisted for less than 270 minutes at 400 mA cm$^{-2}$ current density (applied voltage 1.745 V vs. RHE) (FIG. 20B). Conversely, NiFe-LDH equipped with graphene oxide overlay shows excellent stability at 420 mA cm$^{-2}$ (operating voltage 1.695 V vs. RHE) since the 10 mA current density (FIG. 20B) is lost even after 720 minutes.

FIG. 20C shows the digital images and FE-SEM image of the GO@NiFe-LDH electrode after the OER stability test of 12 hours.

FIG. 20D shows the digital images and FE-SEM image of the NiFe-LDH electrode after the OER stability test of 12 hours.

The GO-NiFe-LDH@NF electrode maintained a 3D foam network similar to that before the OER test (FIG. 20C), but as the 3D network of the electrode was destroyed after the 720 min test (FIG. 20D), the NiFe-LDH@NF electrode showed severe corrosion.

Experimental Example 8

FIGS. 21A-21B show Raman spectra before (FIG. 21A) and after (FIG. 21B) the 12-hour OER stability test of NiFe-LDH according to one Comparative Example of the present application and a GO@NiFe-LDH@NF catalyst (in 1 M KOH+2 M NaCl at 1.745 and 1.695 V vs. RHE respectively at 25° C.)

The characteristic peaks of NiFe-LDH before measurements of NiFe-LDH and GO-NiFe-LDH are exhibited as 301.50 cm$^{-1}$, 468.82 cm$^{-1}$, 543.25 cm$^{-1}$, and 689.8 cm$^{-1}$ (532 nm excitation), and coincide with the peaks of the previously reported peaks (FIG. 21A). And, there are two additional peaks at 1,343.46 cm$^{-1}$ and 1,588.68 cm$^{-1}$ for the G band fingerprint Raman and G band of the G band of the GO-NiFe-LDH catalyst. After the OER stability test, the fact that the NiFe-LDH peak completely disappeared could be seen in both catalysts (FIG. 21B), and two new peaks were observed. A similar anode such as GO@Fe@NiCo@NF was observed in GO@NiFe-LDH, and the 1,233.47 cm$^{-1}$ and 1,432.42 cm$^{-1}$ peaks show that there are D and G band signals of GO together with highly formed carbon oxide. Further, the peaks at 472.2 cm$^{-1}$ and 554.39 cm$^{-1}$ and the peak at 686.6 cm$^{-1}$ for Ni—O oscillation of NiOh show the formation of FeOh species. The two peaks in NiFe-LDH were disposed centering around 472.82 cm$^{-1}$ and 543.77 cm$^{-1}$, which are related to the Ni—O oscillation of NiOh. The negative shift of the 543.77 cm$^{-1}$ peak compared to the 554.39 cm$^{-1}$ peak may be due to the disruption of structure formation during the corrosion process.

These results clearly show that the long-term stability of the anode against chloride corrosion may be achieved at industrial current densities by placing the graphene oxide overlay on the OER catalyst surface.

Further, it could be confirmed that NiFe-LDH@NF showed much reduced OER stability in seawater compared to the Fe@Ni—Co@NF electrode. NiFe-LDH used herein is an alpha-phase metal hydroxide with an interlayer spacing of 8.0 Å or more, whereas Ni—Co LDH of Fe@Ni—Co@NF is a beta-phase metal hydroxide with an interlayer spacing of 4.74 Å. Since higher interlayer spacing may increase chloride anion intercalation during the OER process, a much higher level of chloride corrosion occurs. This is one of the reasons why an alpha-phase metal hydroxide has much lower seawater oxidation resistance than a beta-phase metal hydroxide. The beta-phase metal hydroxide in the GO@Fe@Ni—Co@NF electrode improves the chloride corrosion resistance to contribute to excellent stability during seawater electrolysis.

The foregoing description of the present application is for illustration, and those with ordinary skill in the art to which the present application pertains will be able to understand that it may be easily modified into other specific forms without changing the technical spirit or essential features of the present application. Therefore, it should be understood that the embodiments described above are illustrative in all respects and not restrictive. For example, each element described as a single form may be implemented in a dispersed form, and likewise elements described in the dispersed form may also be implemented in a combined form.

The scope of the present application is indicated by the claims to be described later rather than the above detailed description, and all changes or modified forms derived from the meaning and scope of the claims and equivalent concepts thereof should be construed as being included in the scope of the present application.

What is claimed is:

1. An electrode catalyst for water electrolysis comprising:
a first transition metal foam;
a metal layered double hydroxide (LDH)/metal oxide mixed layer which comprises a second transition metal and a third transition metal that are disposed on a surface of the first transition metal foam;
fourth transition metal oxyhydroxide nanoparticles disposed on a surface of the metal LDH/metal oxide mixed layer; and
a chloride ion blocking layer, comprising a material selected from the group consisting of graphene, graphene oxide, reduced graphene oxide, and combinations thereof, disposed on a surface of the electrode catalyst, wherein a surface of the metal LDH/metal oxide mixed layer comprises the metal layered double hydroxide.

2. The electrode catalyst for water electrolysis of claim 1, wherein the fourth transition metal oxyhydroxide nanoparticles have a diameter of 1 nm to 6 nm.

3. The electrode catalyst for water electrolysis of claim 1, wherein the chloride ion blocking layer has an interlayer spacing of 0.1 nm to 1 nm.

4. The electrode catalyst for water electrolysis of claim 1, wherein the metal LDH is one which is in a beta-phase (B-phase).

5. The electrode catalyst for water electrolysis of claim 1, wherein the metal LDH and the fourth transition metal oxyhydroxide nanoparticles have interfacial oxygen bridges disposed on an interface therebetween.

6. The electrode catalyst for water electrolysis of claim 1, wherein the first transition metal to the fourth transition metal each independently comprise one selected from the group consisting of Ni, Co, Fe, Cu, W, Mo, Sc, Ti, V, Cr, Mn, Zn, Y, Zr, Nb, Tc, Ru, Rh, Pd, Ag, Cd, Hf, Ta, Re, Os, Ir, Pt, Au, Hg, Rf, Db, Sg, Bh, Hs, Mt, Ds, Rg, Cn, and combinations thereof.

7. The electrode catalyst for water electrolysis of claim 1, further comprising a three-dimensional porous structure.

8. The electrode catalyst for water electrolysis of claim 1, wherein the electrode catalyst is one which is used as an electrode catalyst for oxygen evolution reaction (OER) or hydrogen evolution reaction (HER) in alkaline seawater.

9. A seawater decomposition system comprising the electrode catalyst for water electrolysis according to claim 1.

10. A method for preparing an electrode catalyst for water electrolysis, the method comprising:
    a first step of forming a metal layered double hydroxide (LDH) including the second transition metal and the third transition metal on the surface of the first transition metal foam by immersing a first transition metal foam in a solution containing a second transition metal and a third transition metal;
    a second step of forming a metal layered double hydroxide/metal oxide mixed layer by annealing the metal layered double hydroxide; and
    a third step of forming fourth transition metal oxyhydroxide nanoparticles on the surface of the mixed layer by immersing the mixed layer in a solution containing a fourth transition metal oxyhydroxide precursor.

11. The method of claim 10, wherein the third step further comprises a step of forming a chloride ion blocking layer.

12. The method of claim 11, wherein the step of forming the blocking layer comprises a step of immersing the nanoparticles in a solution containing a material selected from the group consisting of graphene, graphene oxide, reduced graphene oxide, and combinations thereof.

13. The method of claim 10, wherein the metal layered double hydroxide is grown in a petal-like shape from the surface of the first transition metal foam.

14. The method of claim 10, wherein the metal layered double hydroxide is converted into a metal oxide layer by annealing it in a temperature range of 100° C. to 400° C.

15. The method of claim 10, wherein the annealing step is performed for 30 minutes to 4 hours.

16. The method of claim 10, wherein the third step is performed by one selected from the group consisting of an electrodeposition method, a coevaporation method, a sputtering method, an RF sputtering method, a DC sputtering method, a reactive sputtering method, an ion beam sputtering method, an evaporation deposition method, a chemical vapor deposition (CVD) method, a low pressure chemical vapor deposition (LPCVD) method, a plasma-enhanced chemical vapor deposition (PECVD) method, an ion plating method, an E-beam evaporation method, a metal organic chemical vapor deposition (MOCVD) method, a molecular beam epitaxy (MBE) method, a screen printing method, a particle deposition method, an atomic layer epitaxy method, and combinations thereof.

\* \* \* \* \*